United States Patent [19]

Schmidt et al.

[11] 4,384,056

[45] May 17, 1983

[54] AQUEOUS DISPERSIONS BASED ON (METH)ACRYLIC ACID ALKYL ESTER POLYMERS WITH TWO PRONOUNCED, SUBSTANTIALLY NON-OVERLAPPING PEAKS IN THE PARTICLE SIZE DISTRIBUTION WITHIN SPECIFIC PARTICLE SIZE RANGES, AND A PROCESS FOR THE PREPARATION AND USE THEREOF

[75] Inventors: Adolf Schmidt, Cologne; Günter Kolb; Werner Clarenz, both of Leverkusen, all of Fed. Rep. of Germany

[73] Assignee: Bayer Aktiengesellschaft, Leverkusen, Fed. Rep. of Germany

[21] Appl. No.: 258,285

[22] Filed: Apr. 28, 1981

[30] Foreign Application Priority Data

May 8, 1980 [DE] Fed. Rep. of Germany ....... 3017543

[51] Int. Cl.³ ............................................. C08L 35/02
[52] U.S. Cl. .................................. 523/221; 524/501; 524/522
[58] Field of Search ................. 260/29.6 R, 29.6 RB; 523/221; 524/501, 522

[56] References Cited

U.S. PATENT DOCUMENTS

| | | | |
|---|---|---|---|
| 3,876,578 | 4/1975 | Takada et al. | 260/29.6 RB |
| 4,046,730 | 9/1977 | Tortai | 260/29.6RB |
| 4,219,454 | 8/1980 | Iacoviello et al. | 260/29.6 T |
| 4,247,438 | 1/1981 | Eck et al. | 260/29.6 T |
| 4,254,004 | 3/1981 | Abbey | 260/29.6 R |

OTHER PUBLICATIONS

Reinhard; H., "Dispersionen Synthetischer Hochpolymerer", Part II, 1969.
Chemical Abstracts, vol. 80, p. 106, No. 16549y (1974).

*Primary Examiner*—Joseph L. Schofer
*Assistant Examiner*—Bernard Lipman
*Attorney, Agent, or Firm*—Connolly and Hutz

[57] ABSTRACT

Aqueous dispersions of polymers containing (meth)acrylic acid alkyl ester units which contain the polymer in the form of relatively large, non-agglomerated, spherical particles (=main spheres) and relatively small, non-agglomerated, spherical particles (=filler spheres), wherein the smaller filler spheres have an average particle diameter $\bar{d}_F$ measured using an electron microscope of from 50 to 150 nanometers (nm) and the average diameter of the large main spheres $\bar{d}_H$ is from 1.35 to 3.5 times larger than the average particle diameter $\bar{d}_F$, provided that $\bar{d}_H$ is at least 140 nm, and wherein the ratio of the total mass of the polymer composed of main spheres $M_H$ to the total mass of the polymer composed of filler spheres $M_F$ is $$M_H:M_F = 20:1 \text{ to } M_H:M_F = 1:20$$

and wherein at least 70% of the number of main spheres and at least 70% of the number of filler spheres lie in the range of ±25% of the respective average value of $\bar{d}_H$ or $\bar{d}_F$.

Dispersions of this type dry to form clear, lustrous and waterproof films, even with a solids content of from 37 to 45% by weight, and even if that solids content has been obtained from more highly concentrated dispersions by dilution with water. The dispersions are used as binders in or as aqueous paint and coating agents for plastics, metals, wood, glass, paper, and cardboard articles, as binders in print dyes, road marking paints and in impregnation or reinforcing agents for paper, leather, woven and non-woven textiles.

9 Claims, No Drawings

AQUEOUS DISPERSIONS BASED ON (METH)ACRYLIC ACID ALKYL ESTER POLYMERS WITH TWO PRONOUNCED, SUBSTANTIALLY NON-OVERLAPPING PEAKS IN THE PARTICLE SIZE DISTRIBUTION WITHIN SPECIFIC PARTICLE SIZE RANGES, AND A PROCESS FOR THE PREPARATION AND USE THEREOF

The invention relates to aqueous dispersions of polymers containing (meth)acrylic alkyl ester units of various, but predetermined particle sizes in predetermined mass ratios, i.e. with two pronounced, substantially non-overlapping peaks in the particle size distribution within specific particle size ranges and a process for the preparation and use thereof. When produced with a solids content of 50% by weight and higher, these dispersions can be diluted to a solids content of from 37 to 45% by weight and, surprisingly, dry, even in the case of the latter solids contents, to form clear, lustrous, water-proof films, whereas, in contrast, corresponding, almost mono-dispersed dispersions each having only one of the two peaks with respect to the particle size distribution do not have these properties.

There is known to be a fundamental difference between the formation of a plastic film from an organic solvent and the formation of a film from an aqueous dispersion (See Hans Reinhard in Chemie, Physik und Technologie der Kunststoffe in Einzeldarstellungen, Dispersionen Synthetischer Hochpolymerer, Volume 14, Part II, Springer-Verlag Berlin, Heidelberg, New York (1969), Pages 10–17).

In the case of dispersions, it is easy for disturbances to occur during film formation, which result in a defective lustre, a rough surface to the film and turbidity in the film.

The formation of highly lustrous, latex films with a smooth closed surface is generally desirable.

It is known from experience that binders which dry turbidly in fact also lead to pigmented coatings which have a poorer lustre than those which dry to form transparent, lustrous films (cf. H. Reinhard, loc. cit. in "Dispersionen synthetischer Hochpolymerer" Part II (1969), Page 52).

The state of the art covers fine-particled, almost mono-dispersed aqueous dispersions based on polymers of (meth)acrylic acid alkyl esters with average particle diameters in the dispersion of about 100–150 nanometers (nm) with a high pigment binding force. These dispersions are adjusted to a solids content of about 50% by weight and have a viscous-pasty consistency in the ammoniacally-thickened state. These dispersions dry in viscous form (about 50% by weight solids conent) to produce clear lustrous films. The lustre of these pigmented coatings, in particular the coatings on metals, leaves much to be desired, however, in many respects.

The formation of a film from such water-diluted dispersions has proven to be defective, in particular at solids contents of from about 37–45% by weight. Clear films drawn from such diluted dispersions have a rough, turbid surface which exhibits numerous defects on the film surface under a microscope.

For many applications, a film-forming polymer dispersion is required which is characterised by a low viscosity and therefore not an excessive solids concentration, excellent stability and, at the same time, an excellent clear film structure.

According to H. Reinhard (in "Dispersionen synthetischer Hochpolymerer" Part II, page 3 loc. cit.), coarser particled aqueous dispersions are, moreover, far less suitable for the preparation of highly lustrous films than are fine-particled dispersions. Furthermore, it has been found that the water-proof characteristic of films composed of such coarse-particled dispersions is poorer than that of films of fine-particled dispersions.

Finally, the state of the art requires that, for the formation of a closed, smooth and therefore also lustrous film surface from aqueous dispersions, the average particle size should be as small as possible and, in addition, the particle size distribution should be sufficiently broad to form a packing of spheres which is as dense as possible from smaller and larger particles (cf. H. Reinhard, loc. cit. in "Dispersionen synthetischer Hochpolymerer", Part II, page 3). In order to achieve a high sphere packing density in a binary random packing, the diameter ratio of the main spheres to the "slippery spheres" (=filler spheres) should be from at least 6.5 to 1 (Pharm. Ind. 39 (1977), 11, Page 1125).

The present invention relates to the preparation of aqueous polymer dispersions which dry in a still clear and lustrous manner with a solids content of from 37 to 45% by weight. The clear films from such dispersions should also exhibit an excellent water-proof characteristic and should dry rapidly.

The dispersions should have an outflow time of less than 25 seconds in a flow-cup according to DIN 53 211 (4 mm nozzle) at about 22° C. and should thus be readily mobile and obviously free from micro-coagulate, which can be troublesome during processing, due to the blockage of nozzles.

It is also desirable to prepare film-forming dispersions having from about 46–55% by weight solids content, which dry to form clear and lustrous films both in a concentrated form and in a form which is diluted to a solids content of from 37–45% by weight.

The object is achieved in that aqueous dispersions of polymers containing (meth)acrylic acid alkyl ester units are prepared which contain the polymer in the form of relatively large, non-agglomerated, spherical particles (=main spheres) and relatively small, non-agglomerated, spherical particles (=filler spheres), wherein the smaller filler spheres have an average particle diameter $\bar{d}_F$ measured using an electron microscope of from 50–150 nanometers (nm) and the average diameter of the large main spheres $\bar{d}_H$ is from 1.35 to 3.5 times larger than the average particle diameter $\bar{d}_F$, provided that $\bar{d}_H$ is at least 140 nm, and wherein the ratio of the total mass of the polymer composed of main spheres $M_H$ to the total mass of the polymer composed of filler spheres $M_F$ is $$M_H:M_F = 20:1 \text{ to } M_H:M_F = 1:20$$

and wherein at least 70% of the number of main spheres and at least 70% of the number of filler spheres lie in the range of ±25% of the respective average value of $\bar{d}_H$ or $\bar{d}_F$.

Dispersions of this type dry to form clear, lustrous and waterproof films, even with a solids content of from 37 to 45% by weight, and even if that solids content has been obtained from more highly concentrated dispersions by dilution with water. This result is all the more surprising in view of the fact that dispersions containing the polymer either in the form of the larger main spheres or the smaller filler spheres produce turbid, non-lustrous or less lustrous films than dispersions according to the invention. Moreover, films with an inadequate waterproof characteristic are obtained in the case of the coarse-particled dispersions. The result is also surprising because various prejudices have to be overcome, since, as already mentioned, for the formation of a closed, smooth and therefore also lustrous film surface from dispersions, the average particle size should be as small as possible and the particle size distribution sufficiently broad such that a sphere packing which is as dense as possible is formed from smaller and larger particles, i.e. the diameter ratio of the larger main spheres to the smaller filler spheres should be from at least 6.5 to 1 for the binary system.

It was also surprising that specific arrangements of dispersion particles, not forming the most dense sphere packing and consisting of main and filler spheres, form particularly lustrous and well closed films, whereas a small particle size and mono-dispersity were considered to be the best condition for the formation of particularly homogenous films (cf. O. L. Wheeler and collaborators, Official Digest, page 1239, December 1954). Large interspersed latex particles also allegedly impair to a considerable extent the formation of a film from emulsion (cf. Houben Weyl Vol XIV/1 Makromolekulare Stoffe, Part 1, Georg Thieme Verlag 1961, page 532).

This invention therefore provides aqueous dispersions containing as binder at least one film-forming polymer composed of polymerised units of (meth)acrylic acid alkyl esters with from 2 to 8 carbon atoms in the alcohol component or at least one film-forming polymer composed of copolymerised units of at least one of the above mentioned (meth)acrylic acid alkyl esters and at least one other vinyl or vinylidene monomer or mixtures thereof, characterised in that the dispersed polymer is in the form of larger, non-agglomerated, spherical particles (=main spheres) and smaller, non-agglomerated spherical particles (=filler spheres), wherein the smaller filler spheres have an average particle diameter $\bar{d}_F$, measured using an electron-microscope, of from 50–150, preferably from 80–130 nanometers (nm) and the average diameter of the large main spheres $\bar{d}_H$ is from 1.35 to 3.5, preferably from 1.8 to 3.5 times larger than the average particle diameter $\bar{d}_F$, but at least 140 nm, and wherein the ratio of the total mass of the polymer composed of main spheres $M_H$ to the total mass of the polymer composed of filler spheres $M_F$ is $M_H:M_F=20:1$ to $M_H:M_F=1:20$ preferably 1:10 to 2:1, and wherein at least 70% of the number of the main spheres and at least 70% of the number of the filler spheres lie in the range of ±25% of the respective average value of $\bar{d}_H$ or of $\bar{d}_F$, and in that, if the dispersion contains several differing polymers, they are compatible with each other.

In the context of the present invention, the polymers are compatible with each other if plates, which are 0.25 cm thick, produced from the polymers are clear and transparent. The plates can be produced by homogenisation of the polymers on rollers and by pressing.

Suitable (meth)acrylic acid alkyl esters containing from 2 to 8 carbon atoms include: ethylacrylate, propylacrylate, butylacrylate, 2-ethylhexylacrylate and the corresponding methacrylic acid esters. Ethylacrylate, n-butylacrylate and 2-ethylhexylacrylate, in particular n-butylacrylate, are preferred.

The terms vinyl monomers and vinylidene monomers refer to:

I aromatic vinyl and vinylidene compounds, for example styrene, α-methylstyrene, α-methyl-p-isopropylstyrene, α-methyl-m-isopropylstyrene, o-, p-chlorostyrene, o-, p-bromostyrene, nuclear-substituted methylstyrene, p-tert.-butylstyrene or mixtures thereof; styrene is preferred.

II Acrylic acid, methacrylic acid, maleic acid semiesters containing from 1 to 8 carbon atoms in the alcohol component. Methacrylic acid and/or acrylic acid, in particular methacrylic acid, are preferred.

III N-alkoxymethyl methacrylamide, N-alkoxymethylacrylamide, each containing from 1 to 4 carbon atoms in the alkoxy group. The abovementioned methacrylamide derivatives, in particular N-methoxymethyl methacrylamide, are preferred.

IV Vinyl esters of organic monocarboxylic acids, wherein the acid component contains from 2 to 4 carbon atoms, such as vinyl acetate and vinyl propionate.

V Monoolefinically unsaturated hydrocarbon halides, such as vinyl chloride or vinylidene chloride.

Preferred copolymers are composed of n-butyl acrylate, styrene, acrylic and/or methacrylic acid and optionally of N-methoxymethylmethacrylamide.

Particularly preferred copolymers are composed of copolymerised units of:
  from 48 to 60% by weight n-butylacrylate;
  from 35 to 48% by weight styrene;
  from 4 to 6% by weight methacrylic acid or acrylic acid or mixtures thereof; and up to 13% by weight N-methoxymethylmethacrylamide, preferably up to 3.5% by weight, the sum of the percentages by weight being 100.

According to the invention, the average particle diameters of the "filler spheres" always differ from the average particle diameters of the larger "main spheres".

The term "average particle diameter" is used in order to clarify the fact that not all filler spheres and all main spheres have the same respective diameters. Rather, the filler spheres and main spheres have a respective distribution about the average particle diameter $\bar{d}_F$ or $\bar{d}_H$. The particle diameter range which lies within the accuracy of measurement of the method of measurement and which includes the numerically largest proportion of the particles is defined as the average particle diameter.

Table I and Table II list the distributions which are characteristic of filler spheres and main spheres in the dispersions according to the invention.

These distributions have been determined using electron-microscope photographs of dispersion particles. The diameters of the dispersion particles photographed by a suitable method of preparation (negative contrast method) were gauged and correlated with the number of gauged particles.

The distributions shown in Tables I and II are examples. The distributions can be somewhat narrower or somewhat broader. The breadth of these distributions is determined by the method chosen and depends, for example, on the speed of stirring. The peak of the distribution curves can also be shifted towards either coarser or smaller average particle diameters. The distribution curves can overlap at the transition from large filler spheres to small main spheres. However, particularly advantageous systems according to the invention are composed of clearly distinguishable filler spheres and main spheres with essentially non-overlapping distribution curves.

TABLE I

Typical latex particle diameter distribution of a dispersion $A_F$ (dispersion with filler spheres according to Example 1).

| No. of Particles | Content in % | Particle diameter range (Nanometer (nm)) |
|---|---|---|
| 2 | 1 | 60–70 |
| 12 | 6 | 70–80 |
| 44 | 22 | 80–90 |
| 70 | 35 | 90–100 |
| 46 | 23 | 100–110 |
| 24 | 12 | 110–120 |
| 2 | 1 | 120–130 |

Key to TABLE I
From 2 to 200 particles (i.e. 1% of numerical content) have a particle diameter in the range of from 60–70 nanometers; from 12 to 200 particles (i.e. 6%) a particle diameter in the range of from 70–80 nanometers etc.

The particles of the dispersion appear to be built up compactly and are spherical and not agglomerated.

TABLE II

Typical latex particle diameter distribution of a dispersion $B_H$ (dispersion with main spheres according to Example 1)

| No. of Particles | Content in % | Particle diameter range (Nanometer (nm)) |
|---|---|---|
| 4 | 2 | 150–160 |
| 30 | 15 | 160–170 |
| 100 | 50 | 170–180 |
| 60 | 30 | 180–190 |
| 6 | 3 | 190–200 |

Key to TABLE II
From 4 to 200 particles (i.e. 2% of numerical content) have a particle diameter in the range of from 150 to 160 nanometers; from 30 to 200 particles (i.e. 15%) have a particle diameter in the range of from 160 to 170 nm, etc.

The particles of the dispersion appear to be built up compactly and are spherical and not agglomerated.

The claimed dispersions can be prepared most simply by mixing a dispersion $A_F$ with filler spheres and a dispersion $B_H$ with main spheres, in a manner to be described in more detail below. It is surprising that, starting from a particle diameter range of $d_F$ of from 50 to 150 nm, with diameter ratios $d_H/d_F = 1.35$–3.5, with the proviso that $d_H$ must be at least 140 nm, it is possible to achieve a quite significant improvement in lustre in comparison with dispersions composed only of latex particles having diameters $d_H$ or $d_F$. In fact, a sphere packing which is as dense as possible cannot even be formed with such diameter ratios and with an irregular sphere distribution. The shrinkage in volume observed, for example, when mixing equal volumes of statistic packings of glass beads having diameters of 1 cm and 0.5 cm can be described as minimal. Moreover, it is dependent on the respective random arrangement of the beads and cannot be specified for individual cases.

Improvements in lustre are possibly anticipated if the small spheres are capable of slipping into the cavities formed by the main spheres to a much greater extent.

After adding a minimal proportion of a coarse-particled, almost mono-dispersed dispersion, $B_H$ to a fine-particled, almost mono-dispersed dispersion, $A_F$, a claimed dispersion which is superior to the starting dispersions $B_H$ and $A_F$ with respect to both lustre and smoothness of film and in which the good waterproof characteristic of the clear films of the finely dispersed, almost mono-dispersed, starting dispersion $A_F$ is maintained is formed within the claimed particle sizes $\bar{d}_H$ and $\bar{d}_F$ and the mass ratios $M_H$ to $M_F$. It should further be emphasised that these properties of the film should also be achieved with dispersions having a solids content within 37–45% by weight, as it is less difficult to achieve the desired properties of the film at a solids content higher than 45% by weight, i.e. these properties are also achieved with fine-particled, mono-dispersed dispersions having substantially only one peak in the particle size distribution. As shown by the comparison Examples in this application, conventional commercially available, fine-particled, almost mono-dispersed dispersions based on acrylate polymers which can correspond to the dispersions $A_F$ dealt with and usually have solids contents above 45% by weight, and which do not yield the desired film properties with respect to lustre and smoothness of film after dilution with water to processing viscosities, can be improved substantially by addition of coarse-particled dispersions $B_H$.

The claimed particle diameter ranges $\bar{d}_F$ and $\bar{d}_H$ of the filler spheres and main spheres are critical parameters for the formation of clear, lustrous and, at the same time, waterproof clear films from the dispersions. The dispersions according to the invention must have two pronounced peaks in the particle size distribution.

If the diameter ratio in the dispersions according to the invention is smaller than 1.35, the films do not dry substantially clearer and more lustrous than dispersions containing only the smaller or only the larger coarse-particled spherical particles. The waterproof characteristic of the films produced from such dispersions deteriorates with a diameter ratio greater than 3.5.

The ratio of the total masses of main spheres and filler spheres $M_H/M_F$ is critical since a desirable effect is not achieved even after adjusting the particle diameter ranges according to the invention if the claimed mass ratios are not observed, particularly if the $M_F$ content is too small. If the dispersions according to the invention are produced by mixing, it is generally easier to promote the formation of lustrous films from a non-lustrously drying, coarsely dispersed dispersion $B_H$ (for example about 200 nm) by addition of small quantities of a fine-particled dispersion $A_F$ than to cause a turbidly drying, finely dispersed system to form lustrous films by addition of coarse particles.

Preferred mixtures have ratios of $$M_F/M_H = 10:1 \text{ to } M_F/M_H = 1:2$$

The mass of the filler spheres usually predominates in preferred systems according to the invention. It predominates, in particular, to permit waterproof films to be formed as quickly as possible.

Additions of small proportions, in terms of weight, of filler spheres to main spheres also lead to an improvement in the lustre of latex films. However, such latex films are usually unsatisfactory in their waterproof characteristic and drying speed. Forced drying at an elevated temperature is then required in order to make such films, which are initially usually still re-dispersible, sufficiently waterproof.

However, such behaviour of dispersions is demanded in certain applications. For example, dispersions for textile printing should form films which are readily re-dispersible at room temperatures but which readily make a film and optionally also cross-link during after-heating at elevated temperatures.

A desirable compromise between fastness and re-dispersibility can always be achieved with dispersions according to the invention.

According to the invention, the average particle diameter of the filler spheres lies in the range of from 50 to 150 nm, preferably in the range of from 80 to 130 nm in the dispersions. If more finely dispersed dispersions are used, it is necessary either to use very much more emulsifier or to incorporate large proportions of hydrophilic groups into the polymer in order to stabilise the dispersions. However, the dispersions according to the invention are required to have maximum waterproof characteristic and simultaneous good stability.

If, on the other hand, the upper limit for the filler spheres of 150 nm is exceeded, these dispersions can be stabilised with a smaller amount of emulsifier, but the coalescence of the particles is made progressively more difficult due to the smaller internal surface area of these dispersions. The waterproof characteristic of such films is also unsatisfactory, in spite of the smaller emulsifier contents, if the formation of the film is not compelled by an elevated temperature.

The dispersions according to the invention, which can have solids contents of from about 37 to 55% by weight and should dry to lustrous, clear, waterproof films even with solids contents of from 37–45% by weight, are, as already mentioned, prepared most simply by mixing two stock dispersions $A_F$ and $B_H$ and by addition of from 0.5 to 3% by weight, based on the polymer, of nonionic emulsifier as stabiliser. The non-ionic emulsifier can also be added to the respective stock dispersion before mixing. $A_F$ and $B_H$ can have identical or different solids contents. $A_F$ contains the smaller filler spheres and $B_H$ the larger main spheres.

$A_F$ can be prepared by known processes of emulsion polymerisation. Discontinuous or semi-continuous processes are preferred, in which the number of latex particles, and thus also the latex particle size, can be regulated by means of the emulsifier and also the initiator concentration in a range of from 50 to 150 nm according to a correlation specified in J. Chem. Physics 16, 592 (1948).

In order to prepare the more coarsely dispersed dispersion $B_H$ the dispersion $A_F$ can be presented as seed latex and intentionally made coarser by polymerisation on the latex nuclei present (with regard to nuclear latex process see: Houben Weyl, Methoden der Organischen Chemie, Volume XIV/1 (1961), page 399 et. seq.). This process is particularly recommended for the adjustment of dispersion particle diameters greater than 150 nm. The adjustment of the latex particles in the range of from 50 to 150 nm can be effected by controlling the emulsifier and initiator concentration.

In addition to the possibility of controlling the particle size by means of the emulsifier and initiator concentration, the selection of the emulsifiers can also contribute to the regulation of particle size.

Anionic emulsifiers, for example sodium lauryl sulphate, sulphates of fatty alcohol mixtures containing from 12 to 18 carbon atoms, p-dodecyl benzene sulphonates and sec. paraffin sulphonates of the type produced by treating paraffin monosulphonic acid chlorides with caustic soda solution, are used for the preparation of particularly finely dispersed latices.

Sulphosuccinic acid esters, in particular sulphosuccinic acid dioctyl ester, sulphates of oxethylated fatty alcohols containing from 3 to 15 mol ethylene oxide per mol fatty alcohol, sulphates containing from 3 to 15 mol ethylene oxide of reacted alkyl phenols can be used for the preparation of somewhat coarser particled latices in the range of from 100 to 150 nm.

Conventional commercially available sodium alkane sulphonates, produced by sulphochlorination of n-paraffins with from 12 to 18 carbon atoms and subsequent saponification with caustic soda solution (cf. Chemie and Technologie der Paraffinkohlenwasserstoffe, Akademie Verlag Berlin, 1956, pages 395–474) as well as ammonium sulphates of a commercial lauryl alcohol condensed with 3 mol ethylene oxide and with 10 mol ethylene oxide are preferably used in quantities of from 0.5 to 1.5% by weight, based on the polymer, for the preparation of the dispersions of the $A_F$ type.

Alkane polysulphonates, in particular, have proved suitable as emulsifiers for the preparation of dispersions of the $B_H$ type with dispersion particle diameters in the range of from 150 to 450 nm. The preparation of such emulsifiers is described hereinafter. They are used in quantities of from 0.5 to 1.5% by weight, based on the polymer. For stabilisation towards electrolytic additives, non-ionogenic emulsifiers are added in quantities of from 0.5 to 3% by weight, based on the polymer, to the dispersions $B_H$ and $A_F$ produced with the aid of anionic emulsifiers after their adjustment to pH=7–9 with aqueous ammonia solution. Non-ionogenic emulsifiers are preferably added only after completion of polymerisation and after addition of ammonia to the polymerised raw latex.

Suitable non-ionogenic emulsifiers contain from 10 to 70 ethylene oxide units per molecule. Condensation products of ethylene oxide with fatty alcohols, fatty acids, resinic acids and phenols or mixture thereof can be used.

The dispersions according to the invention can also be prepared by direct polymerisation in a two-stage process, as illustrated in Example 6.

Other processes for the preparation of dispersions containing a fairly broadly distributed fraction of larger particles in addition to a predominant quantity of smaller filler spheres, involve, for example, polymerisation in the presence of critical quantities of ammonia, polymerisation in the presence of inadequate quantities of emulsifier, the addition of electrolytes to a mono-dispersed dispersion or the partial agglomeration thereof by pressure or the action of heat. However, these other processes are less preferred since they are more difficult to reproduce. An improvement in the lustre of the films can also be achieved by such measures according to the teaching of the present invention.

However, dispersions which form lustrous and waterproof films are preferably prepared according to the invention by mixing stock dispersions $A_F$ and $B_H$ each with narrow diameter distributions.

The dispersions according to the invention can be used for the preparation of paints or as paints and coating compositions for paper, plastics, wood, leather, ceramic materials, glass, metals, as impregnation and compacting agents for paper and cardboard articles, leather and textile fabrics, or as binders in pigment printing, and for road markings.

The percentages and parts indicated relate to the weight, unless already indicated.

EXPERIMENTAL SECTION

1. Explanations

1.1 Starting Materials (Emulsifiers)

The alkali alkane mono-sulphonate emulsifier mentioned in the following examples 1 and 2 is a conventional commercially available $C_{12}$–$C_{18}$—alkane sulphonate mixture (sodium salts) consisting predominantly of mono-sulphonates and containing only small proportions of di- and polysulphonates (less than 10%).

Conventional commercially available lauryl alcohol of commercial purity and a fatty alcohol mixture of from about 45 to 58% dodecyl alcohol, from 19–24% tetradecyl alcohol, from 9–12% hexadecyl alcohol and from 10–13% octadecyl alcohol are used for the preparation of the fatty alcohol ethylene oxide ammonium sulphate used in Example 5 of the present application. 1 mol of this lauryl alcohol is reacted with 10 mol ethylene oxide using an alkaline catalyst at from 130°–140° C. This preliminary polyglycolether product is converted into the sulphuric acid ester in conventional manner by reaction with 1.0 mol chlorosulphonic acid which produces the corresponding ammonium salt after neutralisation with aqueous ammonia. The quantities of emulsifier indicated in the Example relate to a 100% wash-active substance (100% WAS). Emulsifiers containing 3 and 15 mol ethylene oxide are produced accordingly.

The preparation of a suitable polysulphonate-containing emulsifier system, which can optionally be combined with conventional emulsifiers, is described below.

1.1.1. An Emulsifier System containing about 70% by weight of Sodium Alkane Polysulphonate A mixture of linear alkanes (with from 8 to 20 carbon atoms in the molecule and an average of 15 carbon atoms) is sulphochlorinated in the presence of light with a gaseous mixture consisting of 1.1 part by weight sulphur dioxide and 1.0 part by weight chlorine at a temperature of from 30° to 40° C. with stirring and simultaneous cooling. Sulphochlorination is carried out until the reaction mixture has a density of 1.165 g/cm$^3$ at 45° C. The sulphochlorine content is then from 15.5 to 16.0% by weight.

200 g of the sulphonation mixture are added dropwise to 144 g of 50% by weight caustic soda solution which has been heated to from 50° to 60° C. The reaction mixture is kept at a temperature of from 95° to 100° C. by cooling. Upon completion of the reaction, the reaction mixture is adjusted to a pH value of from 9 to 10 by addition of concentrated caustic soda solution. The reaction mixture is then cooled to from 60° to 70° C.

Sodium chloride precipitates in this temperature range, and is filtered or centrifuged off. The solution which is poor in sodium chloride is evaporated to dryness under vacuum. 220 g of sodium alkane sulphonate are obtained in this process. The sodium alkane sulphonate consists of:

28% by weight sodium alkane monosulphonate;
67% by weight sodium alkane polysulphonate The remainder, about 5%, is water and some common salt.

Sodium alkane sulphonate produced in this way is used as emulsifier alone or with addition of sodium alkane monosulphonate or other anionic and/or nonionogenic surface active agents known per se for the emulsion polymerisation of monomers.

1.1.2 Preparation of an Emulsifier System Containing about 90% by weight Sodium Alkane Polysulphonate A mixture of linear alkanes (from 8 to 20 carbon atoms in the molecule and an average of 15 carbon atoms) is sulphochlorinated in the presence of light with a gaseous mixture consisting of 1.1 part by weight sulphur dioxide and 1.0 part by weight chlorine at a temperature of from 50° to 40° C. with stirring and simultaneous cooling. Sulphochlorination is carried out until the reaction mixture has a density of 1.250 g/cm$^3$ at 45° C. The sulphochlorine content is then from 18.0 to 18.5% by weight.

200 g of the sulphonate mixture are added dropwise to 170 g of 50% by weight caustic soda solution which has been heated to from 50° to 60° C. The reaction mixture is kept at a temperature of from 95° to 100° C. by cooling. Upon completion of the reaction, the reaction mixture is adjusted to a pH value of from 9 to 10 by addition of concentrated caustic soda solution. The reaction mixture is then cooled to from 60° to 70° C.

Sodium chloride is precipitated in this temperature range and is filtered or centrifuged off. The solution which is poor in sodium chloride is evaporated to dryness under vacuum. A mixture of 8 g NaCl and 139 g sodium alkane sulphonate are obtained. The sodium alkane sulphonate consists of:

13.2% by weight sodium alkane monosulphonate; and
86.8% by weight sodium alkane polysulphonate.

The sodium alkane sulphonate obtained in this way is used as emulsifier on its own or with addition of sodium alkane monosulphonate or other anionic and/or non-ionogenic surface active agents known per se for the polymerisation of monomers in emulsion.

1.2 Polymerisation Apparatus

Emulsion polymerisation was carried out in the laboratory in a five-necked flask made of Jena glass with a motor-driven KPG stirring mechanism according to Weygand (cf. C. Weygand, Chem. Tech. 16, 64, 1943) with two blades which are offset by 90° to each other and which can be spread by centrifugal force (stirrer blades 5×2 cm), a nitrogen feed pipe, a reflux condenser with a gas blast counter mounted on it, an internal thermometer or thermal sensor tube and connections for the feed pipes for the solutions or monomer mixtures to be introduced in, in the absence of atmospheric oxygen.

Although the stirring speed is uncritical within wide limits, foam formation due to excessively vigorous turbulence must be avoided, as must excessively slow stirring which contributes to increased precipitation and speck formation and a reduced monomer conversion. Blade-type, anchor and cross-beam-type stirrers can be used.

Stirring speeds of about 250 rpm (revolutions per minute) are selected in a 4 liter measure, 120 rpm in a 40 liter autoclave, 80 rpm in a 250 liter stirring kettle, 35–45 rpm in a 10,000 liter autoclave.

The internal temperature measured in the latex was kept constant at about ±0.3° C. using electronic temperature regulators in all cases.

1.3 Analysis of the Dispersions and Clear Films Produced from them

The solids content (in percent per weight) was determined by drying latex samples for 30 minutes at from 180° to 200° C. in tin foil basins in a recirculation cabinet. The values determined in this way coincided satisfactorily with those produced during careful drying of the water to constancy of weight in a desiccator over $CaCl_2$.

The electrolytic stability of the dispersions was determined as follows:

The particular electrolyte solution (for example, 10% NaCl solution) is added slowly and dropwise from a burette to 25 g of latex which is located in an Erlenmeyer flask and thoroughly mixed using a magnetic stirrer. No more than 30 ml of the respective electrolyte solution are added.

Coagulation takes place at a time, depending on the electrolytic compatibility of the respective dispersion. The point at which coagulation begins can easily be detected in most cases. The number of ml at which coagulation begins is given as a gauge of electrolytic stability. The higher the number of ml, the higher the electrolytic stability.

The minimum film-forming temperature, MFT (degrees C.) was determined according to DIN No. 53 787. Some 90μ thick wet films of the dispersion which is usually about 45% were applied using a roller coating system.

Speed of airstream: 0.6 cm/sec:temperature of entering air: 0° C.

The viscosity of the dispersions was measured at various pH values using the flow cup according to DIN 53 211.

The freezing stability of the dispersions was determined in the following manner: a 50 ml screw top bottle made of polyethylene was filled to about 80% of its volume with latex and immersed in a mixture of common salt and ice (temperature about −15° C.) until the dispersion had frozen and solidified. The solidified dispersion was then stored at room temperature and the formation of coagulate was examined after it had thawed.

A Traube stalagmometer (J. Traube: Liebigs Ann. Chem. 265, 27 (1891). was used for measuring the number of droplets (abbreviated to TRZ) in the dispersions. The latex which was at room temperature (about 22° C.) was sucked up in a 1 ml transfer pipette and then slowly dripped (about 1 droplet per second) using a brake capillary tube connected by a three-way tap. The number of droplets into which precisely 1 ml of the dispersion is split was determined (number of droplets TRZ in the dispersion).

For comparison, the number of droplets in 1 ml of pure water was always determined (number of droplets TRZ in water or TRZ $H_2O$).

For information on Stalagmometry, see, for example, K. H. Näser "Physikalische Chemie" Leipzig 1969, page 340.

The average latex particle diameters were determined by laser correlation spectroscopy. The abbreviation LKS is used for the sake of simplicity (Literature: H. Z. Cummins, E. R. Pike, Hsg. Photon Correlation and Light Beating Spectroscopy, Plenum Press 1974; B. Chu, Laser Light Scattering, Academic Press, 1974; D. E. Koppel J. Chem. Phys. 67 (1972) 4814).

With the LKS diffused light method, the information about the scattered particles (latex particles in this case) is obtained from the temporal fluctuations in the diffused light which is recorded by a photo-electric multiplier. These fluctuations of diffused light are based on the irregular Brown diffusion movement of the particles. The translational diffusion coefficient D of the particles, which is linked to the particle diameter d, is accordingly, obtained from the autocorrelation analysis of the diffused light signal.

The diameters determined by measuring the LKS diffused light coincided closely to the values in the range of from 70 to 140 nm measured from the angular dependence of the light diffusion (cf. M. Hofmann, K. Krömer, R. Kuhn Polymeranalytik I, Thieme Taschenlehrbuch B4, Georg Thieme Verlag, Stuttgart, 1977, page 298), so that only the LKS values are specified.

The latex particle diameter distributions were determined using an electron microscope. With the same sample, the latex particles were generally found to be smaller during electron microscopy (cf. Tables 1c, 2b (continuation), 4a, 5b) than after LKS. This result is obvious, because both methods are based on the measurement or visualisation of other effects. However, very good conformity was found in most cases in the diameter ratios of the latex particles detected.

The electrical conductivity of the dispersions is specified in millisiemens (mS), S (Siemens) being the unit of electrical conductance: 1/Ohm. The instrument used demonstrated the conductivity of pure potassium chloride in aqueous solutions concentrated to various extents, as follows: (c=concentration in mol per liter):

| c (Mol/l) KCl | Conductivity (mS) |
|---|---|
| $10^{-3}$ | 0.14 |
| $10^{-2}$ | 1.33 |
| $10^{-1}$ | 12.0 |

In order to determine the coagulate content, the dispersions were first filtered through a fabric having a square mesh width of 200μ and then through a fabric having a square mesh width of 30μ. The symbols have the following meanings:

$K_{200}$ = coagulate content in o/oo, based on polymer, dried to constancy of weight;

$K_{30}$ = coagulate content in o/oo, based on polymer, dried to constancy of weight.

Solid deposits on stirrers, nozzles and the like are taken into consideration at the value $K_{200}$.

The films were applied using a roller coating system (auxiliary for the production of wet films of dispersion in layers having a thickness of 30, 60, 90 and 120μ) in a 6 cm wide web to 9×12 cm long and about 3 mm wide, purified glass plate (treatment of the glass plates with chromosulphuric acid and subsequent rinsing with distilled water and drying). The degree of turbidity (T) depends, after the drying of the films on the thicknesses of the wet film layers selected as well as on the drying temperature. The turbidity (T) or the lustre of the films is, therefore, invariably analysed by taking into consideration the thicknesses of the wet film layers applied and by specifying the drying temperatures.

The films of dispersion applied in various wet film layer thicknesses were either dried for 60 minutes in the open air at room temperature or they were immediately brought into a closed chamber (drying cabinet) adjusted to 50° C. and dried for 60 minutes therein.

Any results which were falsified by differing atmospheric moisture were eliminated, since all comparison tests were carried out simultaneously next to each other.

The turbidity of the films drawn from the dispersions and their lustre were analysed by several people and an average value then determined. A large number of the clear films produced from the dispersions was observed under the microscope and photographed.

The numerals have the following meanings:
Turbidity (T) Grade:
- 0 no turbidity, high lustre
- 1 no turbidity, lustre
- 2 no turbidity, still lustrous
- 3 slight turbidity, hardly lustrous
- 4 marked turbidity, non-lustrous
- 5 rough surface, turbidity, no lustre The waterproof characteristic of the clear films (WF) is also dependent on the thickness of the wet film layer applied and also on the drying time and drying conditions.

The films of dispersion drawn in various wet film layer thicknesses were either dried for 60 minutes freely at room temperature or they were immediately brought into a closed chamber (drying cabinet) adjusted to 50° C. and dried in there for 60 minutes.

After cooling to about 22° C., a thick droplet of water (about 0.4 ml) was placed onto the surface of the films and covered with a glass basin.

The water acted on the film for 30 minutes.

The waterproof characteristic of the point on the surface of the clear film subjected to water was immediately graded after dabbing of the water:
(a) qualitatively visual:
  according to the degree of cloudiness of the film relative to the untouched surface of the film (grades 1-4)
(b) qualitatively mechanical:
  by firm rubbing with the ball of the middle finger (grades A-D)

The entries thus have the following meaning:
1 = marked blushing;
2 = average cloudiness;
3 = slight cloudiness;
4 = no cloudiness visible;
moreover:
A = disintegration of film during rubbing;
B = substantial destruction of film during rubbing;
C = softening;
D = solid, tough surface, no damage.

Grade 4D is thus the best. The film is not clouded at the point dampened with water and it cannot be destroyed by firm rubbing with a finger.

Accordingly, the film having a waterproof characteristic 1A is markedly clouded after subjection to water and can be crumbled or redispersed by rubbing with the ball of a finger.

2. EXAMPLES

EXAMPLE 1

The solutions or mixtures 1.a.1 to 1.a.6 for the preparation of two dispersions 1-$A_F$ and 1-$B_H$ were introduced as follows into a 4 liter polymerisation apparatus according to explanation 1.2 (cf. Table 1a):

The particular emulsifier solution 1.a.1 is, together with its respective monomer mixture 1.a.2, placed in a flask under a nitrogen atmosphere, heated uniformly for 30 minutes with stirring (250 revolutions per minute) until a temperature of +70° C. is achieved in the mixture.

Polymerisation starts in both compositions after the simultaneous additions of solutions 1.a.3 and 1.a.4 (addition in about 5 seconds each). Polymerisation is initiated after 1 to 2 minutes. As soon as a seed latex is formed and the heat of reaction has cooled, after about 10 minutes, the linear addition of mixtures 1.a.5 and 1.a.6 begins within 6 hours.

At the beginning of supplies 1.a.5 and 1.a.6, the polymerisation temperature measured in the latex is raised to 80° C. and then kept constant for 8 hours. After cooling to room temperature, the untreated dispersions 1-$A_F$ and 1-$B_H$ are identified (cf. Table 1d).

The solids content of the dispersions 1-$A_F$ and 1-$B_H$ is about 45% by weight. With a quantitative monomer conversion, the solids content of the dispersions is 45.3% by weight.

In view of the high monomer conversion and the desirable copolymerisation parameters, the integral composition of the polymer can be made equal to the composition of the monomer mixture. The copolymers of 1-$A_F$ and of 1-$B_H$ consequently consist of copolymerised units of:
- 55.9% by weight n-butylacrylate
- 37.8% by weight styrene
- 5.4% by weight methacrylic acid
- 0.9% by weight N-methoxymethylmethacrylamide.

TABLE 1a

| Mixture or Solution | Chemicals | Parts by Weight (g) Dispersion 1-$A_F$ | Dispersion 1-$B_H$ |
|---|---|---|---|
| 1.a.1 | De-ionized water | 1200 | 1200 |
| | Alkalialkanemonosulphonat emulsifier | 2.4 | — |
| | Polysulphonate-containing emulsifier with 70% by weight sodium alkane polysulphonate (cf 1.1.1) | — | 1.0 |
| 1.a.2 | n-Butylacrylate | 70.3 | 70.3 |
| | Styrene | 47.6 | 47.6 |
| | Methacrylic acid | 6.8 | 6.8 |
| | N—methoxymethylmethacrylamide | 1.1 | 1.1 |
| 1.a.3 | De-ionized water | 75.0 | 75.0 |
| | Potassium peroxodisulphate | 1.6 | 1.6 |
| 1.a.4 | De-ionized water | 75.0 | 75.0 |
| | Sodium pyrosulphite | 0.7 | 0.7 |
| 1.a.5 | n-Butylacrylate | 733.1 | 733.1 |
| | Styrene | 496.5 | 496.5 |
| | Methacrylic acid | 70.7 | 70.7 |
| | N—Methoxymethylmethacrylamide | 11.9 | 11.9 |
| 1.a.6 | De-ionized water | 402.0 | 402.0 |
| | Alkalialkanemonosulphonate emulsifier | 5.0 | — |
| | Polysulphonate-containing emulsifier with 70% by weight sodium alkane polysulphonate (cf 1.1.1) | — | 5.0 |
| | Potassium peroxodisulphate | 3.7 | 3.7 |
| Sum of Chemicals Parts by weight (g) | | 3203.4 | 3202.0 |

TABLE 1b

| Dispersion | 1-$A_F$ | 1-$B_H$ |
|---|---|---|
| Quantity (g) | about 3200 | about 3200 |
| *$K_{200}$ (°/$_{oo}$) | about 0.2 | about 0.4 |
| *$K_{30}$ (°/$_{oo}$) | about 0.1 | about 0.2 |
| pH Value | 2.9 | 2.9 |
| Solids Content (%) | about 45 | about 45 |
| Outflow time | 18 | 12 |

TABLE 1b-continued

| Dispersion | 1-A$_F$ | 1-B$_H$ |
|---|---|---|
| according to DIN 53 211 4-mm-Nozzle | | |

Key to TABLE 1b
See text of Example 1 and paragraph 1.3
*Coagulate content

In acidic form, the dispersions have a low viscosity (outflow time 12–18 seconds) and can be produced substantially coagulate-free and speck-free.

For stabilisation towards sheer stress and electrolytic additives, the dispersions which are filtered through a 200μ sieve and then through a 30μ sieve are adjusted to a pH value of 8.5 with about 20% pure aqueous ammonia with thorough mixing. 1% by weight, based on the total weight of the dispersion, of a non-ionogenic emulsifier, based on a phenol condensed with 2.7 mol styrene and with 50 mol ethylene oxide, dissolved in sufficient water for the solids content of both dispersions to be exactly 42% by weight, is subsequently added.

The dispersions obtained in this way are designated by 1-A$_{Fn}$ and 1-B$_{Hn}$ to distinguish them from the untreated dispersions.

If desired, the adjustment of the dispersions 1-A$_F$ and 1-A$_H$ with ammonia can be followed first by a degasification stage to remove the residual monomers, followed only then by the addition of the non-ionogenic emulsifier.

Table 1c shows that the dispersions 1-A$_{Fn}$ and 1-B$_{Hn}$ differ predominantly in the latex particle size. The finely dispersed dispersion 1-A$_{Fn}$ is slightly more viscous than 1-B$_{Hn}$ (outflow time 19 instead of 15 seconds) and its electrolytic stability toward 10% aqueous aluminium sulphate solution is much slighter (4.5 instead of more than 30 ml).

TABLE 1c

| Dispersion | 1-A$_{Fn}$ | 1-B$_{Hn}$ |
|---|---|---|
| Solids Content (%) | 42 | 42 |
| pH Value | 8.5 | 8.5 |
| Outflow time in the flow cup, 4 mm ⌀ nozzle according to DIN 53 211:(sec) | 19 | 15 |
| Electrolytic stability 25 g Dispersion | | |
| ml 10% aqueous NaCl solution | >30 | >30 |
| ml 10% aqueous CaCl$_2$ solution | >30 | >30 |
| ml 10% aqueous Al$_2$(SO$_4$)$_3$ solution | 4.5 | >30 |
| Freezing stability | No Coagulation | No Coagulation |
| Electrical conductivity Dispersion (mS) | about 3 | about 3 |
| No. of droplets 1 ml Dispersion | 40 | 36 |
| No. of droplets 1 ml Water | 23 | 23 |
| Average film-forming Temperature (MFT) (°C.) | 15 | 17 |
| Average latex particle diameter (nm) according to laser correlation spectroscopy | about 110 | about 250 |
| Average latex particle Diameter (nm) according to electron-microscopy | (cf. Tb.I) about 70 | (cf. Tab.III) about 180 |

Key to TABLE 1c:
cf. Text in paragraph 1.3, "Analysis of the dispersions", and text of Example 1.

The dispersions are substantially comparable in their electrical conductivity (each about 3 mS), their number of droplets (40 and 36 droplets per ml of dispersion), their film-forming temperature (15° and 17° C.), and obviously their solids content and pH value which have already been adjusted. Both dispersions can also congeal and neither dispersion contains coagulate as it thaws.

The dispersions 1-A$_{Fn}$ and 1-B$_{Hn}$ are now applied in 150μ, 90μ, and 30μ wet film layer thicknesses for examination of their clear films with regard to lustre and waterproof characteristic.

The drying of the wet films of differing thicknesses at room temperature and also at 50° C. in a drying cabinet is interrupted after exactly 60 minutes.

An analysis was made, as described in detail in paragraph 1.3.

Table 1d shows that neither the dispersion 1-A$_{Fn}$ nor the dispersion 1-B$_{Hn}$ dries to clear lustrous films (grades 3 to 5). In addition, the more coarsely dispersed dispersion 1-B$_{Hn}$ still has not formed a waterproof film after 60 minutes drying at 22° C. (grade 1A, i.e. marked turbidity and re-dispersal).

Aqueous lacquers produced using such dispersions exhibit unsatisfactory coatings in terms of lustre even after addition of film-forming auxiliaries, emulsifiers and other auxiliary substances.

Mixtures are now prepared according to the invention from the two 42% dispersions:

1-A$_{Fn}$ average dispersion particle diameter about 110 nm (according to LKS), and 1-B$_{Hn}$ average dispersion particle diameter about 250 nm (according to LKS).

The particle diameters determined using an electron microscope can be inferred from Table I and II.

TABLE 1d

| Dispersion | Wet Film Layer Thickness (μ) | 30 | 90 | 150 |
|---|---|---|---|---|
| 1-A$_{Fn}$ | Drying 22° C. Turbidity of film | 4 | 5 | 5 |
| | Drying 22° C. Waterproofness | 4A | 4D | 4D |
| | Drying 50° C. Turbidity of film | 4 | 5 | 5 |
| | Drying 50° C. Waterproofness | 4D | 4D | 4D |
| 1-B$_{Hn}$ | Drying 22° C. Turbidity of film | 3 | 5 | 5 |
| | Drying 22° C. Waterproofness | 1A | 1A | 1A |
| | Drying 50° C. Turbidity of film | 3 | 5 | 5 |
| | Drying 50° C. Waterproofness | 3D | 3D | 3D |

Key to TABLE 1d:
cf. text of Example 1 as well as paragraph 1.3: "Analysis of the dispersions and clear films produced from them".

As the dispersions 1-A$_{Fn}$ and 1-B$_{Hn}$ have the same solids content, the weighed-in parts by weight of the dispersions behave like their polymer masses M$_F$/M$_H$:

TABLE 1e

| Ratio Parts by wt. 42% Latices 1-A$_{Fn}$/1-B$_{Hn}$ | Ratio poly-Masses M$_F$/M$_H$ | Designation of Mixture 1-A$_{Fn}$/1-B$_{Hn}$ |
|---|---|---|
| 25:1 | 25:1 | a |
| 20:1 | 20:1 | b |
| 15:1 | 15:1 | c |
| 10:1 | 10:1 | d |
| 7:1 | 7:1 | e |
| 6:1 | 6:1 | f |
| 5:1 | 5:1 | g |
| 1:1 | 1:1 | h |
| 1:5 | 1:5 | i |
| 1:6 | 1:6 | j |
| 1:7 | 1:7 | k |

TABLE 1e-continued

| Ratio Parts by wt. 42% Latices $1\text{-}A_{Fn}/1\text{-}B_{Hn}$ | Ratio poly-Masses $M_F/M_H$ | Designation of Mixture $1\text{-}A_{Fn}/1\text{-}B_{Hn}$ |
|---|---|---|
| 1:10 | 1:10 | l |
| 1:15 | 1:15 | m |
| 1:20 | 1:20 | n |
| 1:25 | 1:25 | o |

The mixtures a to o were now drawn over glass plates in layers of varying thicknesses (30, 50 and 150μ), two series a-o being dried once at room temperature (about 22° C.) and once in a drying cabinet at 50° C., for 60 minutes in each case. The results of the clear film tests are compiled in Table 1f (Grading cf. paragraph 1.3).

TABLE 1f

| Mixtures: 42% Dispersions in each case $1\text{-}A_{Fn}/1\text{-}B_{Hn}$ | | Drying at 23° C.; 56% relative atmospheric moisture | | | | | | Drying at 50° C. | | | | |
|---|---|---|---|---|---|---|---|---|---|---|---|---|
| | | 30μ | | 90μ | | 150μ | | 30μ | | 90μ | | 150μ |
| Desig-nation | Ratio $M_F/M_H$ | T | WF | T | WF | T | WF | T | WF | T | WF | T | WF |
| a | 25:1 | 4 | 3D | 5 | 4D | 5 | 4D | 3 | 4B | 5 | 4D | 5 | 4D |
| b | 20:1 | 3 | 3B | 4 | 4D | 4 | 4D | 3 | 4B | 5 | 4D | 5 | 4D |
| c | 15:1 | 1 | 3B | 3 | 4D | 3 | 4D | 0 | 4B | 3 | 4D | 3 | 4D |
| d | 10:1 | 0 | 4D | 2 | 4D | 2 | 4D | 0 | 4D | 0 | 4D | 1 | 4D |
| e | 7:1 | 0 | 4D | 1 | 4D | 1 | 4D | 0 | 4D | 0 | 4D | 0 | 4D |
| f | 6:1 | 0 | 4D | 0 | 4D | 0 | 4D | 0 | 4D | 0 | 4D | 0 | 4D |
| g | 5:1 | 0 | 3D | 0 | 4D | 0 | 4D | 0 | 3D | 0 | 4D | 0 | 4D |
| h | 1:1 | 0 | 3D | 0 | 3D | 0 | 3D | 0 | 3D | 0 | 4D | 0 | 4D |
| i | 1:5 | 0 | 1A | 0 | 1A | 0 | 1A | 0 | 3C | 0 | 3D | 0 | 4D |
| j | 1:6 | 0 | 1A | 0 | 1A | 0 | 1A | 0 | 3C | 0 | 3D | 0 | 4D |
| k | 1:7 | 0 | 1A | 0 | 1A | 0 | 1A | 0 | 3C | 0 | 3D | 0 | 4D |
| l | 1:10 | 0 | 1A | 0 | 1A | 0 | 1A | 0 | 3C | 0 | 3D | 0 | 4D |
| m | 1:15 | 0 | 1A | 0 | 1A | 0 | 1A | 0 | 3C | 0 | 3D | 0 | 3D |
| n | 1:20 | 0 | 1A | 0 | 1A | 0 | 1A | 0 | 3C | 0 | 3D | 0 | 3D |
| o | 1:25 | 0 | 1A | 0 | 1A | 0 | 1A | 0 | 3B | 0 | 3D | 0 | 3D |

For explanations to Table 1f, see text of Example 1 as well as paragraphs 1.3 "Analysis of the dispersions and clear films produced from them".

The symbols in Table 1f have the following meanings:
T=Turbidity;
WF=Waterproofness;
0=Clear lustrous film;
5=Turbid film;
4D=Very good waterproof characteristic;
1A=Poor waterproof characteristic;
Designations a-o see Table 1e.

In Table 1f, the waterproof characteristic of the films (cf. columns WF) usually decreases as the $M_H$, the coarse-particled component, content increases. With a thin-layer thickness (30μ), on the other hand, an optimum is observed at $M_F/M_H$ ratios of from 10:1 to 1:1. A tendency to a better lustre in the clear films begins to emerge at $M_F/M_H$ ratios of 20:1, and an optimum lies in the range of from 7:1 to 1:1, in the respect that good lustre and good waterproof characteristic of the clear film are found simultaneously in this range (grade 0=very good lustre; grade 4D=good waterproof characteristic).

Minimal additions of the finely-dispersed dispersions $1\text{-}A_{Fn}$ to the coarsely dispersed dispersion $1\text{-}B_{Hn}$ are sufficient to help the latter to form highly lustrous films. As also shown in Table 1f, films which receive the entry 1A in waterproofness at 22° C. (poorest value) can form a better film at a somewhat higher temperature and then exhibit a somewhat better waterproof characteristic. It can also be observed that films composed of dispersions can improve their waterproofness quite decisively after prolonged storage at room temperature.

The turbid drying of the dispersion $1\text{-}A_{Fn}$ can consequently be effectively eliminated by addition of the latex $1\text{-}B_{Hn}$ which also dries turbidly in itself. Additions of emulsifiers, of film-forming auxiliaries to $1\text{-}A_{Fn}$ or $1\text{-}B_{Hn}$ were found to be unsuitable for eliminating the turbidity in the film. The addition of the emulsifier of dispersion $1\text{-}A_F$ to $1\text{-}B_H$ or vice-versa, the addition of the emulsifier of $1\text{-}B_H$ to $1\text{-}A_F$ demonstrated, in addition to a deterioration in the waterproof characteristic of the film, no lustre-improving effects.

EXAMPLE 2

The solutions or mixtures 2.a.1 to 2.a.5 are introduced into a 1.5 liter polymerisation apparatus according to paragraph 1.2 of the explanations (see Table 2a) in order to produce four dispersions 2-A to 2-D having quite different particle sizes, as follows:

The particular emulsifier solution 2.a.1 is, together with its respective monomer mixture 2.a.2, heated under a nitrogen atmosphere with stirring (300 revs. per minute, glass blades 2×5 cm), until an internal temperature of 75° C. is attained (heating time about 30 minutes).

Polymerisation is then initiated by addition of the activator solution 2.a.3 in each case (addition in 5 seconds).

As soon as seed latices have been formed and the heat of polymerisation has died down, the monomer mixtures 2.a.4 as well as the emulsifier activator solutions 2.a.5 are added over 3 hours. The internal temperatures measured in the latex are each maintained at 75° C.

After the monomer streams 2.a.4 and the emulsifier activator solutions 2.a.5 have been added, the mixture is subsequently stirred for a further 3 hours at 75° C. in orde to complete polymerisation.

The emulsifiers specified in Table 2a under 2.a.1 having a varying content of mono- and polysulphonates are easily accessible by mixing the emulsifiers which may be prepared according to section 1.1, with commercially-conventional sodium alkane monosulphonate emulsifiers of the same carbon chain length. The sulphate of an oxethylated alcohol, mentioned in second place is the ammonium salt of the sulphuric acid semi-ester of a commercial lauryl alcohol reacted with 15 mols of ethylene oxide (see section 1.1).

When polymerisation has finished and the mixture has cooled to 22° C., the dispersions are filtered. The coagulate portion is very small and the solids content of the dispersions is approximately 46% by weight in each case (46.38% by weight is the maximum attainable value). Thus, the integral composition of the polymers corresponds to the composition of the monomer mixture (see Table 2a at the bottom). The dispersions which are still acid (pH: approx. 3) and contain approximately 46% by weight of solid substance are initially adjusted to pH 8.5 using approximately 20% ammonia water and, based on 100 parts by weight of 45% latex, 1.07 parts by weight of a nonionic emulsifier, based on a phenol condensed with 2.7 mol styrene and 50 mol ethylene oxide and a calculated quantity of water are then added to form a precisely 45% latex in each case. These dispersions containing 45% by weight of solids are now designated as follows:

2-$A_n$; 2-$B_n$; 2-$C_n$; 2-$D_n$.

Table 2b and the continuation of Table 2b accordingly indicate the average latex particle diameters of the dispersions 2-$A_n$ to 2-$D_n$, measured by LKS, as well as, in particular, latex particle diameter distributions determined by electron-microscopic investigations on n=200 particles.

The independent methods of determination lead to somewhat different values for the average particle diameter, but the diameter ratios conform well with each other. Each dispersion has a clearly pronounced particle diameter maximum. Over 70% of the number of particles measured fit in a range which is equal to ±25% of the average particle diameter d. Overlaps occur with the dispersions 2-$A_n$ and 2-$B_n$ as well as 2-$B_n$ and 2-$C_n$ since large filler spheres of the more finely particled dispersion are of the same size as small main spheres in the respective coarser particled dispersion. The average particle diameters of the dispersions differ in extreme cases by a factor of about 3 (combination 2-$A_n$ with 2-$D_n$).

Parts of the individual dispersions 2-$A_n$ to 2-$D_n$ are now diluted by addition of de-ionized water from a solids content of 45% by weight in each case to solids contents of 42; 40 and 30% by weight.

The electrical conductivity, number of droplets, outflow time in the flow cup according to DIN 53 211 (4 mm, 22° C.) are determined from the individual dilution stages of the dispersions (see Table 2c).

Some 150μ wet films are also drawn over glass and dried for 60 minutes in a drying cabinet at 50° C. from the individual dilution stages.

The clear films are then analysed with respect to their lustre and their waterproof characteristic (analysis criteria, cf. paragraph 1.3).

All films are rough on the surface and clouded by surface textures (grades 3-5). The waterproof characteristic of the clear films obviously decreases as the dilution increases as the thickness of the layers, remaining after evaporation of the water, diminishes. The coarsest particled dispersion has the poorest waterproof characteristic (dispersion 2-$D_n$).

Lacquers produced from these turbidly-drying dispersions do not develop a good lustre even when using film-forming auxiliaries.

Equal parts by weight of dispersions which each correspond in their solids content but differ in their average latex particle size are now mixed together (cf. Tables 2d and 2e).

The outflow time, electrical conductivity and number of droplets in these mixtures are determined, and some 150μ thick wet films are drawn from the individual variations in mixture and the various dilution stages thereof and dried for 60 minutes at 50° C. in a drying cabinet. They are then analysed.

Tables 2d and 2e show:

(a) Films with good lustre (grade 0) are only produced over a broad solids content range (from 30 to 45% by weight) in those dispersion mixtures whose main sphere/filler sphere ratio (dispersion particle diameter ratio $\bar{d}_H/\bar{d}_F$, cf. last two lines of Tables 2d and 2e, is from 2.8 to 3.1 (combinations 2-$A_n$/2-$D_n$) or from 2.2 to 2.4 (combinations 2-$B_n$/2-$D_n$) or from 1.9 to 2.0 (combinations 2-$C_n$/2-$D_n$).

(b) Films having a much reduced lustre are produced from dispersion mixtures whose main sphere/filler sphere particle diameter ratio $\bar{d}_H/\bar{d}_F$, cf. last lines of Tables 2d and 2e, is from 1.29 to 1.3 (combination 2-$A_n$/2-$B_n$) or from 1.1 to 1.2 (combination 2-$B_n$/2-$C_n$) or in which there is a mixture of equal parts of dispersions having particle diameter ratios of 1:1.3:1.5:3 (combination 2-$A_n$/2-$B_n$/2-$C_n$/2-$D_n$).

(c) Films with good waterproof characteristic and good lustre are formed with the combinations listed under (a) if the average particle diameter of the fundamental component of the mixture, which yields the filler spheres, lies within the range below 135 nm, measured by LKS.

TABLE 2a

| | Name of Mixture | 2-A | 2-B | 2-C | 2-D |
|---|---|---|---|---|---|
| 2.a.1 | De-ionized water | 400 | 400 | 400 | 400 |
| | Emulsifier mono/polysulphonate 85:15 p. by Wt. | 4 | — | — | — |
| | Fatty alcohol-15-Ethylene oxide-ammonium sulphate | — | 4 | — | — |
| | Emulsifier mono/polysulphonate 50:50 parts by weight | — | — | 4 | — |
| | Emulsifier mono/polysulphonate 30:70 | — | — | — | 4 |
| 2.a.2 | n-butyl acrylate | 25.5 | 25.5 | 25.5 | 25.5 |
| | Styrene | 22.5 | 22.5 | 22.5 | 22.5 |
| | Methacrylic acid | 2.0 | 2.0 | 2.0 | 2.0 |
| 2.a.3 | De-ionized water | 50.0 | 50.0 | 50.0 | 50.0 |
| | Ammonium peroxo-disulphate | 0.7 | 0.7 | 0.7 | 0.7 |
| 2.a.4 | n-butyl acrylate | 229.5 | 229.5 | 229.5 | 229.5 |
| | Styrene | 202.5 | 202.5 | 202.5 | 202.5 |
| | Methacrylic acid | 18.0 | 18.0 | 18.0 | 18.0 |
| 2.a.5 | De-ionized water | 140.0 | 140.0 | 140.0 | 140.0 |
| | Ammonium peroxo-disulphate | 2.3 | 2.3 | 2.3 | 2.3 |
| | Emulsifier mono/polysulphonate 85:15 parts by weight | 3.5 | — | — | — |
| | Fatty alcohol-30-Ethylene ammonium sulphate | — | 3.5 | — | — |
| | Emulsifier mono/polysulphonate 50:50 parts by weight | — | — | 3.5 | — |
| | Emulsifier mono/poly sulphonate 30:70 | — | — | — | 3.5 |
| | Total parts by wt. (g) | 1100.5 | 1100.5 | 1100.5 | 1100.5 |
| | Monomer Compositions | | | | |

TABLE 2a-continued

| Name of Mixture | 2-A | 2-B | 2-C | 2-D |
|---|---|---|---|---|
| (parts by weight) | | | | |

TABLE 2b

| Particle Diameter Range (nm) | 2-A$_n$ n | 2-A$_n$ % | 2-B$_n$ n | 2-B$_n$ % | 2-C$_n$ n | 2-C$_n$ % | 2-D$_n$ n | 2-D$_n$ % |
|---|---|---|---|---|---|---|---|---|
| 40–50 | 8 | 4 | — | — | — | — | — | — |
| 50–60 | 22 | 11 | — | — | — | — | — | — |
| 60–70 | 54 | 27 | — | — | — | — | — | — |
| 70–80 | 102 | 51 | 20 | 10 | 2 | 1 | — | — |
| 80–90 | 14 | 7 | 80 | 40 | 2 | 1 | — | — |
| 90–100 | — | — | 96 | 48 | 22 | 11 | — | — |
| 100–110 | — | — | 4 | 2 | 84 | 42 | — | — |
| 110–120 | — | — | — | — | 84 | 42 | — | — |
| 120–130 | — | — | — | — | 6 | 3 | — | — |
| 130–140 | — | — | — | — | — | — | — | — |
| 140–150 | — | — | — | — | — | — | — | — |
| 150–160 | — | — | — | — | — | — | — | — |
| 160–170 | — | — | — | — | — | — | — | — |
| 170–180 | — | — | — | — | — | — | — | — |
| 180–190 | — | — | — | — | — | — | 2 | 1 |
| 190–200 | — | — | — | — | — | — | 4 | 2 |
| 200–210 | — | — | — | — | — | — | 44 | 22 |
| 210–220 | — | — | — | — | — | — | 90 | 45 |
| 220–230 | — | — | — | — | — | — | 44 | 22 |
| 230–240 | — | — | — | — | — | — | 10 | 5 |
| 240–250 | — | — | — | — | — | — | 4 | 2 |
| 250–260 | — | — | — | — | — | — | 2 | 1 |

| Dispersions According to Example 2 | 2-A$_n$ | 2-B$_n$ | 2-C$_n$ | 2-D$_n$ |
|---|---|---|---|---|
| Average Particle Diameter (nm): | | | | |
| By electron microscopy | 70 | 90 | 109 | 218 |
| By LKS: | 92 | 120 | 135 | 260 |
| Particle Diameter Ratio: | | | | |
| By electron microscopy | 1 | 1.28 | 1.56 | 3.11 |
| By LKS: | 1 | 1.30 | 1.47 | 2.83 |
| Range ± 25% of $\bar{d}$ (nm) Electron microscopy | 52–88 | 67–113 | 82–136 | 163–272 |
| Percentage of particles in Range of ± 25% of $\bar{d}$ | about 95 | about 100 | about 100 | about 100 |

Key: n is the number of particles falling within a predetermined particle diameter range (nm) from a total of 200 particles which are measured in diameter; the number is given as a percentage next to it; the diameters are determined by electron-microscope photographs.

TABLE 2c

| | Solids Content % by Weight | | | | Solids Content % by Weight | | | | Solids Content % by Weight | | | | Solids Content % by Weight | | | |
|---|---|---|---|---|---|---|---|---|---|---|---|---|---|---|---|---|
| | 45 | 42 | 40 | 30 | 45 | 42 | 40 | 30 | 45 | 42 | 40 | 30 | 45 | 42 | 40 | 30 |
| Dispersion 2-A$_n$ | X | X | X | X | | | | | | | | | | | | |
| Dispersion 2-B$_n$ | | | | | X | X | X | X | | | | | | | | |
| Dispersion 2-C$_n$ | | | | | | | | | X | X | X | X | | | | |
| Dispersion 2-D$_n$ | | | | | | | | | | | | | X | X | X | X |
| pH Value | 8.5 | | | | 8.5 | | | | 8.5 | | | | 8.5 | | | |
| Outflow time in flow cup ⌀ 4 mm | 17.7 | 15.6 | 13.8 | 11.1 | 13.1 | 12.3 | 11.8 | 10.6 | 13.2 | 12 | 11.6 | 10.8 | 13.2 | 12.2 | 11.9 | 10.9 |
| Conductivity (mS) | 4.8 | 4.5 | 4.4 | 3.4 | 4.8 | 4.4 | 4.2 | 3.4 | 4.5 | 4.2 | 4 | 3.2 | 5.6 | 5.3 | 5 | 4.2 |
| No. of droplets Latex | 39 | 41 | 41 | 43 | 36 | 37 | 35 | 37 | 38 | 39 | 39 | 39 | 41 | 41 | 42 | 42 |
| No. of droplets Water | 24 | 23 | 23 | 24 | 25 | 23 | 23 | 24 | 25 | 23 | 23 | 24 | 25 | 23 | 23 | 24 |
| Film 150μ, wet 50° C., 60 Min. Turbidity (Gr.1–5) | 3 | 3 | 4 | 4 | 5 | 5 | 5 | 5 | 5 | 5 | 5 | 5 | 5 | 5 | 5 | 5 |
| Waterproofness (Grade 1A–4D) | 4D | 4D | 3D | 3D | 4D | 3D | 3D | 3D | 4D | 3D | 3D | ƷD | 1D | 3D | 1D | 1D |
| Average film-forming Temperature °C. | 22 | | | | 22 | | | | 22.5 | | | | 24 | | | |

Key to TABLE 2c: cf. text of Example 2, also paragraph 1.3 "Analysis of the Dispersions..." The dependence of the structure of the clear film on the solids content of dispersions is indicated in TABLE 2c.

TABLE 2d

| | Solids Content in % by weight | | | | Solids Content in % by weight | | | | Solids Content in % by weight | | | | Solids Content in % by weight | | | |
|---|---|---|---|---|---|---|---|---|---|---|---|---|---|---|---|---|
| | 45 | 42 | 40 | 30 | 45 | 42 | 40 | 30 | 45 | 42 | 40 | 30 | 45 | 42 | 40 | 30 |
| Dispersion 2-A$_n$ | x | x | x | x | x | x | x | x | x | x | x | x | | | | |
| Dispersion 2-B$_n$ | x | x | x | x | | | | | | | | | x | x | x | x |
| Dispersion 2-C$_n$ | | | | | x | x | x | x | | | | | x | x | x | x |
| Dispersion 2-D$_n$ | | | | | | | | | x | x | x | x | | | | |
| pH Value | 8.5 | | | | 8.5 | | | | 8.5 | | | | 8.5 | | | |
| Outflow time in flow cup 4 ⌀ mm. | 14.3 | 12.2 | 11.5 | 10.8 | 14.3 | 13.5 | 12 | 10.7 | 13.1 | 12 | 11.6 | 11 | 13.1 | 12 | 11.7 | 10.6 |
| Conductivity (mS) | 4.8 | 4.4 | 4.3 | 3.4 | 4.6 | 4.3 | 4.2 | 3.3 | 5.2 | 4.8 | 4.7 | 3.8 | 4.6 | 4.3 | 4.1 | 3.3 |
| No. of droplets Latex | 40 | 40 | 41 | 41 | 40 | 41 | 42 | 43 | 42 | 41 | 43 | 43 | 36 | 38 | 37 | 38 |
| No. of droplets Water | 25 | 23 | 23 | 24 | 25 | 23 | 23 | 24 | 25 | 23 | 23 | 24 | 25 | 23 | 23 | 24 |
| Film 150μ, wet 50° C., 60 Min. Turbidity (Gr. 1–5) | 3 | 3 | 4 | 4 | 1 | 3 | 4 | 4 | 0 | 0 | 0 | 0 | 1 | 5 | 5 | 4 |

TABLE 2d-continued

| | Solids Content in % by weight | | | | Solids Content in % by weight | | | | Solids Content in % by weight | | | | Solids Content in % by weight | | | |
|---|---|---|---|---|---|---|---|---|---|---|---|---|---|---|---|---|
| | 45 | 42 | 40 | 30 | 45 | 42 | 40 | 30 | 45 | 42 | 40 | 30 | 45 | 42 | 40 | 30 |
| Waterproofness (Entry 1A–4D) | 4D | 4D | 3D | 2D | 3D | 3D | 2D | 2D | ¾D | ¾D | 3D | 3D | ¾D | 3D | 1D | 1D |
| $d_H/d_F$: Diameter ratio main sphere/filler sphere | | | | | | | | | | | | | | | | |
| (a) By LKS | 1.30 | 1.30 | 1.30 | 1.30 | 1.47 | 1.47 | 1.47 | 1.47 | 2.83 | 2.83 | 2.83 | 2.83 | 1.12 | 1.12 | 1.12 | 1.12 |
| (b) By electron microscopy | 1.29 | 1.29 | 1.29 | 1.29 | 1.56 | 1.56 | 1.56 | 1.56 | 3.11 | 3.11 | 3.11 | 3.11 | 1.21 | 1.21 | 1.21 | 1.21 |

TABLE 2e

| | Solids Content in % by weight | | | | Solids Content in % by weight | | | | Solids Content in % by weight | | | |
|---|---|---|---|---|---|---|---|---|---|---|---|---|
| | 45 | 42 | 40 | 30 | 45 | 42 | 40 | 30 | 45 | 42 | 40 | 30 |
| Dispersion 2-$A_n$ | | | | | | | | | x | x | x | x |
| Dispersion 2-$B_n$ | x | x | x | x | | | | | x | x | x | x |
| Dispersion 2-$C_n$ | | | | | x | x | x | x | x | x | x | x |
| Dispersion 2-$D_n$ | x | x | x | x | x | x | x | x | x | x | x | x |
| pH Value | 8.5 | | | | 8.5 | | | | 8.5 | | | |
| Outflow time in flow cup 4 mm ⌀ | 13 | 12 | 11.6 | 11 | 12.6 | 11.7 | 11.5 | 10.5 | 13.8 | 11.9 | 11.5 | 10.8 |
| Conductivity (mS) | 5.2 | 4.8 | 4.6 | 3.8 | 5 | 4.8 | 4.5 | 3.7 | 5.2 | 4.6 | 4.4 | 3.3 |
| No. of droplets Latex | 42 | 41 | 43 | 43 | 40 | 41 | 40 | 40 | 41 | 40 | 41 | 42 |
| No. of droplets Water | 25 | 23 | 23 | 24 | 25 | 23 | 23 | 24 | 25 | 23 | 23 | 24 |
| Film 150μ, wet 50° C., 60 Min. Turbidity (Gr. 1–5) | 0 | 0 | 0 | 0 | 0 | 0 | 0 | 0 | 1 | ⅔ | 3 | 2 |
| Waterproofness (Grade 1A–4D) | ¾D | 3D | 3D | 2D | 3D | 3D | 1D | 1A | ⅔D | 3D | ½D | 1A |
| $d_H/d_F$: Diameter ratio main sphere/filler sphere | | | | | | | | | | | | |
| (a) By LKS | 2.17 | 2.17 | 2.17 | 2.17 | 1.93 | 1.93 | 1.93 | 1.93 | — | — | — | — |
| (b) By electron microscopy | 2.42 | 2.42 | 2.42 | 2.42 | 2.00 | 2.00 | 2.00 | 2.00 | — | — | — | — |

EXAMPLE 3

The dispersions 1–29 listed in Table 3a were produced with reference to Example 1.

The parts within one group in Table 3a (for example 1 and 2 in 3-I; 3 and 4 in 3-II, etc.) were each polymerised under the same instructions.

The differing latex particle sizes of 3-I, 3-II, 3-III, 3-IV and 3-V were obtained by slight modifications in the concentration of the emulsifier used with the recipe for dispersion 1-$A_F$, Example 1, the quantities of the chemicals used remaining constant in each case.

Group 3-VI relates to dispersions according to Example 1 (dispersion 1-$A_F$) which have, however, been produced using equal quantities of a different anionic emulsifier (ammonium sulphate of a lauryl alcohol reacted with 3 mol ethylene oxide).

Group 3-VII relates to slight variations from the recipe in Example 1 (1-$B_H$) made in the starting emulsifier composition.

The same monomer mixture was used for polymerisation in all experiments 1–29, and the same polymerisation conditions as in Example 1 were selected (identical temperature control, stirring and additions).

The polymer yield was virtually quantitative in all experiments 1–29, the untreated dispersions were about 45% pure and the integral polymer composition therefore consists, in all cases, of copolymerised units of:

55.9% by weight n-butylacrylate;
37.8% by weight styrene;
5.4% by weight methacrylic acid; and
0.9% by weight N-methoxymethyl-methacrylamide.

The untreated dispersions containing about 45% by weight of solids were each adjusted to a solids content of 42% by weight according to Example 1 by addition of aqueous ammonia, identical non-ionogenic emulsifier and water.

The outflow time of the individual portions adjusted in this way was, as desired, less than 25 seconds in the flow cup according to DIN 53 211, 4 mm nozzle (cf. Table 3a, column 3).

However, all 150μ wet films dried turbidly with a rough surface at room temperature (22° C.), and the waterproof characteristic of the finely dispersed dispersions was better than that of the coarse particled dispersions (cf. columns 4 and 5 of Table 3a).

Mixtures 3-I to 3-VII were now produced by combining equal contents by weight of their fundamental 42% pure individual portions (for example, mixture 3-III by combining equal parts by weight of the 42% portions 5, 6, 7, 8 and 9).

The average particle size of these mixtures was determined for control purposes (cf. column 7 of Table 3a), similarly their outflow time (cf. column 8 Table 3a), their number of droplets in comparison to the number of droplets of the water (cf. column 9, Table 3a), their electrical conductivity (cf. column 10, Table 3a), their stability towards additions of 10% pure CaCl$_2$ solution (column 11, Table 3a), as well as their average film-forming temperature (column 12, Table 3a).

Mixtures 3-I to 3-VII also proved to be stable to congealing and coagulation of the dispersions did not occur even after heating them at from 50°–60° C. in closed bottles for several weeks.

Now although the mixtures 3-I to 3-VII do not differ externally in many points from the individual portions forming the basis thereof, it is noteworthy that the mixtures 3-VI and 3-VII exhibit much better clear film properties than was expected due to the behaviour of the individual dispersions forming the basis thereof (cf. Table 3a, columns 4 and 5 with columns 13 and 14, last two lines).

Quite significant improvements in the quality of the films of dispersions were achieved only by the combination according to the invention of finely dispersed and coarsely dispersed dispersions.

Table 3b gives a survey of the combinations made between mixtures 3-I to 3-VII and of the lustre and waterproof characteristic of the clear films which were produced from the mixtures of 3-I and 3-VI, applied in a wet film layer thickness of 150μ and dried at 22° C. and also at 50° C.

To sum up, the following criteria lead to the production of dispersions which dry clearly, lustrously and, at the same time, in an excellently waterproof manner:

1. The smaller the average diameter $\bar{d}_F$ of the latex particle filler spheres selected is, the larger the ratio $\bar{d}_H/\bar{d}_F$ (i.e. the diameter ratio of main spheres to filler spheres) within the claimed ranges of $\bar{d}_H/\bar{d}_F = 1.35$ to $3.5$ must be in the case of a fixed $M_F/M_H$ (i.e. total mass ratio of filler spheres to main spheres).

2. The larger the diameter $\bar{d}_F$ of the selected filler spheres in the range indicated is, the less critical the systems become with respect to lustre, and the smaller the quantities of coarse-particled main spheres present must be, but at the same time, the lower the waterproof characteristic of the resulting clear films.

3. The smaller the diameter $\bar{d}_F$ of the filler spheres selected is, the smaller the quotient $M_F/M_H$ within the claimed limits must be (i.e. the higher the number of main spheres in the mixture must be).

4. Particularly preferred systems contain filler spheres with an average particle diameter measured by LKS of from 105 to 140 nm (corresponding to about 80 to 130 nm in the electron microscope), the ratio of the total masses of filler spheres to main spheres $M_F/M_H$ lying in the range of from 1:1 to 10:1 and increasing markedly in proportion with the diameter $\bar{d}_F$.

Finally, it is also demonstrated that polydisperse systems, produced by mixing the dispersion mixtures 3-I to 3-VII (cf. Tables 3c), are inferior to the binary combinations according to the invention.

TABLE 3a

| Experiment | Particle ⌀ LKS (nm) | Outflow Time [sec] | 150μ Wet Film 22° C. T | WF | Mixture |
|---|---|---|---|---|---|
| 1 | 92;91 | 17.8 | 5 | 4D | 3-I |
| 2 | 94;90 | 20.7 | 3 | 4D | |
| 3 | 96;95 | 18.0 | 5 | 4D | 3-II |
| 4 | 100;98 | 18.5 | 4 | 4D | |
| 5 | 106;104;102;102 | 17.7 | 4 | 4D | 3-III |
| 6 | 106;103;102;104 | 15.8 | 4 | 4D | |
| 7 | 104;102 | 20.1 | 4 | 4D | |
| 8 | 104;104 | 19.3 | 4 | 4D | |
| 9 | 102;99 | 18.8 | 5 | 4D | |
| 10 | 111;110 | 17.7 | 4 | 3D | 3-IV |
| 11 | 106;108 | 15.8 | 5 | ¾D | |
| 12 | 114;106;105 | 17.5 | 4 | 4D | |
| 13 | 115;111;111 | 15.7 | 5 | 4D | |
| 14 | 107;108 | 15.8 | 5 | 4D | |
| 15 | 112;107;106 | 19.1 | 5 | 4D | |
| 16 | 110;105;106 | 18.2 | 5 | 4D | |

TABLE 3a-continued

| 17 | 105;109 | 18.3 | 5 | 4D | |
| 18 | 118;117 | 15.9 | 5 | 4D | 3-V |
| 19 | 119;119 | 15.6 | 4 | 4D | |
| 20 | 122;118 | 14.4 | 5 | 3D | |
| 21 | 121;116;117 | 16.0 | 5 | 4D | |
| 22 | 137;144;137 | 15.2 | 2 | 3D | 3-VI |
| 23 | 152;156 | 14.8 | 3 | ⅜D | |
| 24 | 137;140 | 14.3 | 5 | 3D | |
| 25 | 131;126;127 | 14.8 | 5 | 3D | |
| 26 | 212;208;204;204 | 15.4 | 5 | 1A | 3-VII |
| 27 | 191;196;191;189 | 13.5 | 5 | 1A | |
| 28 | 218;206;208 | 15.4 | 5 | 1A | |
| 29 | 236;227;227;239 | 18.1 | 5 | 1A | |

| Experiment | LKS Particle ⌀ [nm] | Outflow Time [sec] | TRZ L (HOH) | Conductivity [mS] | 10% ig. CaCl₂—Lsg. |
|---|---|---|---|---|---|
| 1–2 } 3-I | 93;89 | 18.0 | 37(23) | 4.1 | >30 ml |
| 3–4 } 3-II | 91;89 | 18.1 | 39(23) | 3.8 | >30 ml |
| 5–9 } 3-III | 104;102 | 15.8 | 41(23) | 3.5 | >30 ml |
| 10–18 } 3-IV | 110;109 | 15.8 | 41(23) | 3.6 | >30 ml |
| 19–22 } 3-V | 123;120 | 14.3 | 43(23) | 3.4 | >30 ml |
| 23–26 } 3-VI | 139;145 | 14.2 | 34(23) | 5.5 | >30 ml |
| 27–29 } 3-VII | 208;210 | 15.2 | 36(23) | 3.5 | >30 ml |

| Experiment | MFT [°C.] | Drying 22° C. T | WF | Drying 50° C. T | WF |
|---|---|---|---|---|---|
| 1–2 } 3-I | 17 | 5 | 4D | 5 | 4D |
| 3–4 } 3-II | 18 | 4 | 4D | 4 | 4D |
| 5–9 } 3-III | 17 | 5 | 4D | 5 | 4D |
| 10–18 } 3-IV | 18 | 5 | 4D | 5 | 4D |
| 19–22 } 3-V | 17 | 5 | 4D | 5 | 4D |
| 23–27 } 3-VI | 14 | 2 | 3D | 2 | ⅜D |

TABLE 3a-continued

| | | | | | | |
|---|---|---|---|---|---|---|
| 28 | 3-VII | 18 | 2 | 1A | 2 | 3D |
| 29 | | | | | | |

TABLE 3b

Drying at 22° C.
Quantitative ratios 42%
Dispersions: $M_F/M_F$

| LKS $d_F$ nm | Combination | $d_H/d_F$ | 1:1 T | WF | 3:1 T | WF | 5:1 T | WF | 7:1 T | WF | 10:1 T | WF | 15:1 T | WF |
|---|---|---|---|---|---|---|---|---|---|---|---|---|---|---|
| ca. 90 | 3-I + 3-II | 1.05 | 5 | 4D | | | | | | | | | | |
| | 3-I + 3-III | 1.16 | 5 | 4D | | | | | | | | | | |
| | 3-I + 3-IV | 1.22 | 5 | 4D | | | | | | | | | | |
| | 3-I + 3-V | 1.33 | 5 | 4D | | | | | | | | | | |
| | 3-I + 3-VI | 1.55 | 4 | 4D | | | | | | | | | | |
| | 3-I + 3-VII | 2.33 | 0 | 4D | 1 | 4D | 2 | 4D | 3 | 4D | 4 | 4D | 5 | 4D |
| ca. 95 | 3-II + 3-III | 1.10 | 5 | 4D | | | | | | | | | | |
| | 3-II + 3-IV | 1.16 | 4 | 4D | | | | | | | | | | |
| | 3-II + 3-V | 1.26 | 4 | 4D | | | | | | | | | | |
| | 3-II + 3-VI | 1.47 | 3 | 4D | | | | | | | | | | |
| | 3-II + 3-VII | 2.21 | 0 | 4D | 1 | 4D | 2 | 4D | 3 | 4D | 4 | 4D | 4 | 4D |
| ca. 105 | 3-III + 3-IV | 1.05 | 3 | 4D | | | | | | | | | | |
| | 3-III + 3-V | 1.14 | 2 | 4D | | | | | | | | | | |
| | 3-III + 3-VI | 1.33 | 3 | 4D | | | | | | | | | | |
| | 3-III + 3-VII | 2.00 | 0 | 4D | 1 | 4D | 2 | 4D | 2 | 4D | 4 | 4D | | |
| ca. 110 | 3-IV + 3-V | 1.09 | 3 | 4D | | | | | | | | | | |
| | 3-IV + 3-VI | 1.27 | 2 | ¾D | | | | | | | | | | |
| | 3-IV + 3-VII | 1.90 | 0 | 3D | 0 | 4D | 0 | 4D | 0 | 4D | ⅔ | 4D | 3 | 4D |
| ca. 120 | 3-V + 3-VI | 1.16 | 2 | 4D | | | | | | | | | | |
| | 3-V + 3-VII | 1.75 | 0 | 3D | 0 | ¾D | 0 | ¾D | 0 | ¾D | ⅔ | ¾D | 4 | 4D |
| ca. 140 | 3-VI + 3-VII | 1.50 | 0 | 3D | 0 | 3D | 0 | 3D | 0 | 3D | 0 | ¾D | 0-1 | ¾D |

Drying at 50° C.
Quantitative ratios 42%
Dispersions: $M_F/M_F$

| LKS $d_F$ nm | Combination | 1:1 T | WF | 3:1 T | WF | 5:1 T | WF | 7:1 T | WF | 10:1 T | WF | 15:1 T | WF |
|---|---|---|---|---|---|---|---|---|---|---|---|---|---|
| ca. 90 | 3-I + 3-II | 5 | 4D | | | | | | | | | | |
| | 3-I + 3-III | 5 | 4D | | | | | | | | | | |
| | 3-I + 3-IV | 5 | 4D | | | | | | | | | | |
| | 3-I + 3-V | 5 | 4D | | | | | | | | | | |
| | 3-I + 3-VI | 5 | 4D | | | | | | | | | | |
| | 3-I + 3-VII | 0 | 4D | 1 | 4D | 2 | 4D | 3 | 4D | ¾ | 4D | 4 | 4D |
| ca. 95 | 3-II + 3-III | 5 | 4D | | | | | | | | | | |
| | 3-II + 3-IV | 4 | 4D | | | | | | | | | | |
| | 3-II + 3-V | 4 | 4D | | | | | | | | | | |
| | 3-II + 3-VI | 3 | 4D | | | | | | | | | | |
| | 3-II + 3-VII | 0 | 4D | 0 | 4D | 1 | 4D | ½ | 4D | 3 | 4D | 4 | 4D |
| ca. 105 | 3-III + 3-IV | | | | | | | | | | | | |
| | 3-III + 3-V | | | | | | | | | | | | |
| | 3-III + 3-VI | | | | | | | | | | | | |
| | 3-III + 3-VII | 0 | 4D | 0 | ¾D | 0 | ¾D | 0 | ¾D | 1 | 4D | ¾ | 4D |
| ca. 110 | 3-IV + 3-V | | | | | | | | | | | | |
| | 3-IV + 3-VI | | | | | | | | | | | | |
| | 3-IV + 3-VII | 0 | 4D | 0 | 4D | 0 | 4D | 1 | 4D | 3 | 4D | ¾ | 4D |
| ca. 120 | 3-V + 3-VI | | | | | | | | | | | | |
| | 3-V + 3-VII | 0 | 4D | 0 | 4D | 0 | 4D | 0 | 4D | 2 | 4D | 5 | 4D |
| ca. 140 | 3-VI + 3-VII | 0 | 4D | 0 | ¾D | 0 | ¾D | 0 | ¾D | 0 | ¾D | 0 | ¾D |

TABLE 3c

| Combinations | Diameter ratios of Latex particles | Mixing ratios parts by weight | 150μ Wet Films Drying 22° C. T | WF | Drying 50° C. T | WF |
|---|---|---|---|---|---|---|
| 3-I + 3-II + 3-III | 1:1.05:1.16 | 1:1:1 | 3-4 | 4D | 2 | 4D |
| 3-I + 3-II + 3-III + 3-IV | 1:1.05:1.16:1.22 | 1:1:1:1 | 3-4 | 4D | 3-4 | 4D |
| 3-I + 3-II + 3-III + 3-IV + 3-V | 1:1.05:1.16:1.22:1.33 | 1:1:1:1:1 | 3 | 4D | 2 | 4D |
| 3-I + 3-II + 3-III + 3-IV + 3-V + 3-VI | 1:1.05:1.16:1.22:1.33:1.55 | 1:1:1:1:1:1 | 4 | 4D | 3-4 | 4D |
| 3-I + 3-II + 3-III + 3-IV + 3-V + 3-VI + 3-VII | 1:1.05:1.16:1.22:1.33:1.55:2.33 | 1:1:1:1:1:1:1 | 3 | 4D | 1-2 | 3-4D |

EXAMPLE 4

(Comparison Example)

Four commercially available copolymer dispersions based on the monomers n-butylacrylate/styrene, the method of production and the exact polymer composition of which are not known but which have an almost identical infra-red spectrum, were examined with regard to their latex particle diameter distribution (cf. Table 4a).

The product 4-A is the most finely particled, and products 4-B; 4-C; 4-D follow on.

4-A, 4-B and 4-C are commercially about 50% by weight dispersions and are used as high quality binders for paints. Their average film-forming temperature (MFT) is about 20° C. 4-D is yielded at about 48% pure and acts as a textile finishing auxiliary. 4-A, 4-B, 4-C are relatively viscous dispersions whose outflow time cannot be measured in a flow cup according to DIN 53 211. On the other hand, 4-D is readily movable (outflow time about 15 seconds) and has an MFT of about 7° C.

All four dispersions form clear films in the form in which they are obtained.

The four dispersions are now each diluted to:

(a) 45% by weight solids content;

(b) 42% by weight solids content; and (c) 40% by weight solids content;

by addition of de-ionized water. Films in a wet film layer thickness of 150μ, 90μ and 30μ are then produced from each commercial product diluted with water.

The films are dried for 60 minutes both at room temperature (about 22° C.) and at +50° C. and then examined with respect to lustre and waterproof characteristic.

Although lustrous films are formed from the concentrated dispersions (solids content higher than 45% by weight), the lustre of films produced from the diluted dispersions diminishes markedly (cf. Table 4b).

The product 4-D which has a broad latex particle diameter distribution behaves the best in this case with respect to lustre. However, waterproof films are not formed either with air-drying or at 50° C., so the product is unsuitable as a binder for painting purposes.

Comparison between Table 4d (commercial dispersions) and Table 2d and 2e and in particular 1f as well as 3b shows that dispersions according to the invention produce films with a quite significantly improved lustre and at the same time either equal or much improved waterproof charasteristic.

If 4-A and 4-B or 4-A and 4-C are mixed together in a 40–45% by weight form, only a slight improvement can be observed in the lustre of the films produced from the mixtures in comparison with the films produced from the accordingly diluted commercial products.

However, if 4-A and 4-D, 4-B and 4-D or 4-C and 4-D are each mixed in a ratio of 6:1 and diluted to solids contents of from 40 to 45% by weight by addition of water, clear, highly lustrous transparent films having a quite significantly improved waterproof characteristic in comparison with the product 4-D are produced (drying at 50° C.).

Excellent results are obtained if the commercial dispersions 4-A, 4-B and 4-C are combined with the dispersions 1-$B_{Hn}$ produced according to Example 1. For example, one part of 1-$B_{Hn}$ is sufficient for 20 parts 4-C and the mixture of the two substances dries lustrously.

The present Example shows that, by combining given products which are known per se, new dispersions are formed according to the invention having a significantly improved property spectrum which cannot be deduced by addition from the properties of the stock dispersions.

TABLE 4a

| Latex particle diameter range [nm] | 4-A n | 4-A % | 4-B n | 4-B % | 4-C n | 4-C % | 4-D n | 4-D % |
|---|---|---|---|---|---|---|---|---|
| 40–50 | — | — | — | — | — | — | — | — |
| 50–60 | 1 | 0.5 | — | — | — | — | — | — |
| 60–70 | 1 | 0.5 | — | — | — | — | — | — |
| 70–80 | 10 | 5 | — | — | — | — | — | — |
| 80–90 | 42 | 21 | 2 | 1 | — | — | — | — |
| 90–100 | 80 | 40 | 30 | 15 | 4 | 2 | — | — |
| 100–110 | 44 | 22 | 98 | 49 | 20 | 10 | 1 | 0.5 |
| 110–120 | 18 | 9 | 66 | 33 | 90 | 45 | 1 | 0.5 |
| 120–130 | 4 | 2 | 4 | 2 | 76 | 38 | 2 | 1.0 |
| 130–140 | — | — | — | — | 8 | 4 | 2 | 1.0 |
| 140–150 | — | — | — | — | 2 | 1 | 16 | 8.0 |
| 150–160 | — | — | — | — | — | — | 34 | 17.0 |
| 160–170 | — | — | — | — | — | — | 58 | 29.0 |
| 170–180 | — | — | — | — | — | — | 38 | 19.0 |
| 180–190 | — | — | — | — | — | — | 20 | 10.0 |
| 190–120 | — | — | — | — | — | — | 16 | 8.0 |
| 200–210 | — | — | — | — | — | — | 8 | 4.0 |
| 210–220 | — | — | — | — | — | — | 2 | 1.0 |
| 220–230 | — | — | — | — | — | — | 2 | 1.0 |
| 230–240 | — | — | — | — | — | — | — | — |
| 240–250 | — | — | — | — | — | — | — | — |
| 250–260 | — | — | — | — | — | — | — | — |

Table 4a: cf. text of Example 4; electron-microscopic investigation of commercially available acrylate styrene copolymer dispersions 3-A to 3-D. The particles of 3-A to 3-C are well-formed spheres and the configuration of the particles of dispersion 3-D is not uniform; n = number of particles determined in the diameter and the percentage thereof next to it.

| Dispersion, Designation | 4-A | 4-B | 4-C | 4-D |
|---|---|---|---|---|
| Average particle diameter (nm): | | | | |
| by electron microscopy | 97 | 109 | 116 | 172 |
| By LKS | 127 | 150 | 166 | 207 |
| Range ± 25% of $\bar{d}$ (nm) | | | | |
| Electron microscopy | 73–121 | 82–136 | 87–145 | 129–215 |
| % of particles in the range of ± 25% of $\bar{d}$ | about 90 | about 100 | about 100 | about 96 |
| Diameter ratios by electron microscopy | 1 | 1.12 | 1.19 | 1.77 |
| Diameter ratios according to LKS | 1 | 1.18 | 1.31 | 1.62 |

TABLE 4b

| | | Films, dried at +22° C. | | | | | | | | | | | |
|---|---|---|---|---|---|---|---|---|---|---|---|---|---|
| | | Commercial Dispersions | | | | | | | | Combination according to invention | | | |
| Solids Content % by weight | Wet Film thickness [μ] | 4-A T | 4-A WF | 4-B T | 4-B WF | 4-C T | 4-C WF | 4-D T | 4-D WF | 4-A/4-D 6:1 T | 4-A/4-D 6:1 WF | 4-A/1-$B_{Hn}$ 6:1 T | 4-A/1-$B_{Hn}$ 6:1 WF |
| 45 | 150 | 3 | 2C | 1 | 1A | 2 | 1A | 2 | 1A | 0 | 1A | 0 | 1A |
| 45 | 90 | 3 | 2A | 1 | 1A | 2 | 1A | 1 | 1A | 0 | 1A | 0 | 1A |

TABLE 4b-continued

| 45 | 30  | 2 | 1A | 1 | 1A | 2 | 1A | 1 | 1A | 0 | 1A | 0 | 1A |
| -- | --- | - | -- | - | -- | - | -- | - | -- | - | -- | - | -- |
| 42 | 150 | 3 | 1B | 3 | 1A | 4 | 1A | 2 | 1A | 0 | 1A | 0 | 1A |
| 42 | 90  | 2 | 2A | 3 | 1A | 3 | 1A | 1 | 1A | 0 | 1A | 0 | 1A |
| 42 | 30  | 1 | 1A | 2 | 1A | 2 | 1A | 1 | 1A | 0 | 1A | 0 | 1A |
| 40 | 150 | 3 | 1A | 5 | 1A | 5 | 1A | 2 | 1A | 0 | 1A | 0 | 1A |
| 40 | 90  | 2 | 1A | 5 | 1A | 5 | 1A | 2 | 1A | 0 | 1A | 0 | 1A |
| 40 | 30  | 1 | 1A | 5 | 1A | 5 | 1A | 1 | 1A | 0 | 1A | 0 | 1A |

Films, dried at +50° C.

| Solids Content % by weight | Wet Film thickness [μ] | Commercial Dispersions | | | | | | | | Combination according to invention | | | |
|---|---|---|---|---|---|---|---|---|---|---|---|---|---|
| | | 4-A | | 4-B | | 4-C | | 4-D | | 4-A/4-D 6:1 | | 4-A/1-$B_{Hn}$ 6:1 | |
| | | T | WF | T | WF | T | WF | T | WF | T | WF | T | WF |
| 45 | 150 | 3 | 4D | 1 | 4D | 3 | 4D | 2 | 1A | 0 | 4D | 0 | 4D |
| 45 | 90  | 3 | 4D | 1 | 4D | 2 | 4D | 1 | 1A | 0 | 4D | 0 | 4D |
| 45 | 30  | 1 | 4D | 1 | 3C | 1 | 3C | 1 | 1A | 0 | 3D | 0 | 3D |
| 42 | 150 | 5 | 4D | 3 | 4D | 2 | 4D | 1 | 1A | 0 | 4D | 0 | 4D |
| 42 | 90  | 2 | 4D | 2 | 4C | 2 | 4D | 1 | 1A | 0 | 3D | 0 | 4D |
| 42 | 30  | 1 | 3D | 1 | 4C | 2 | 3C | 1 | 1A | 0 | 3D | 0 | 3D |
| 40 | 150 | 4 | 4D | 5 | 3D | 5 | 3D | 2 | 1A | 0 | 4D | 0 | 4D |
| 40 | 90  | 4 | 4D | 4 | 3C | 5 | 4D | 2 | 1A | 0 | 3D | 0 | 4D |
| 40 | 30  | 2 | 3D | 3 | 3C | 4 | 3C | 0 | 1A | 0 | 3D | 0 | 3D |

EXAMPLE 5

The solutions and the mixtures 5.a.1 to 5.a.6 listed in Table 5a are polymerised by the same process as the mixtures and solutions 1.a.1 to 1.a.6 in Example 1 (cf. Table 1a).

The monomer composition also corresponds to that in Example 1. The integral composition of the polymer corresponds to the monomer composition due to the virtually quantitative monomer conversion.

The untreated dispersions 5-$A_F$ and 5-$B_H$ obtained after polymerisation and having a respective solids content of about 50% by weight were adjusted to a pH=8.5 as described in Example 1 with 20% pure ammonia water and then reacted with 1% by weight, based on polymer, of a non-ionogenic emulsifier based on a resinic acid (abietic acid) condensed with 50 mol ethylene oxide dissolved in water, so that the solids content of the resulting dispersions 5-$A_{Fn}$ and 5-$B_{Hn}$ was 47.5% by weight.

The latex particles diameter distribution of the dispersion 5-$A_{Fn}$ and the dispersion 5-$B_{Hn}$ can be inferred from Table 5b for each case. Mixtures having the same solids content of 5-$A_{Fn}$ with 5-$B_{Hn}$ in a ratio of:

$$5\text{-}A_{Fn}:5\text{-}B_{Hn} = 1:1 \text{ to } 6:1$$

dry in the range of from 37 to 47.5% by weight solids content at room temperature and at 50° C. in wet film layer thicknesses of 150μ; 90μ; 30μ (grade 4D) to lustrous, clear and waterproof films which are always superior (grade 0) in lustre to the starting components 5-$A_{Fn}$ and 5-$B_{Hn}$.

The above-mentioned dispersion mixtures which have a quite different latex particle diameter distribution are excellently stable electrolytically, stable to shearing, compatible with pigments and also stable to congealing. They can be processed in a manner known per se to form dispersion dyes having an improved lustre.

TABLE 5a

| Mixture or solution | Chemicals | Parts by weight (g) | |
|---|---|---|---|
| | | 5-$A_F$ | 5-$B_H$ |
| 5.a.1 | De-ionized water | 1200 | 1200 |
| | Polysulphonate-containing emulsifier with 70% by weight sodiumalkanepolysulphonate (cf. para 1.1.1) | — | 4.0 |
| | Fatty alcohol ethylene oxide Ammonium sulphate with 10 mol ethylene oxide (cf. para 1.1) | 4.0 | — |
| 5.a.2 | n-Butylacrylate | 70.3 | 70.3 |
| | Styrene | 47.6 | 47.6 |
| | Methacrylic acid | 6.8 | 6.8 |
| | N—methoxymethyl-methacrylate | 1.1 | 1.1 |
| 5.a.3 | De-ionized water | 75.0 | 75.0 |
| | Potassium peroxo-disulphate | 1.6 | 1.6 |
| 5.a.4 | De-ionized water | 75.0 | 75.0 |
| | Sodium pyrosulphite | 0.7 | 0.7 |
| 5.a.5 | n-Butylacrylate | 899.1 | 899.1 |
| | Styrene | 608.8 | 608.8 |
| | Methacrylic acid | 86.7 | 86.7 |
| | N—methoxymethyl-methacrylamide | 14.6 | 14.6 |
| 5.a.6 | De-ionized water | 402.0 | 402.0 |
| | Emulsifier with 70% by weight sodium alkane polysulphonate (cf. para 1.1.1) | — | 7.5 |
| | Fatty alcohol ethylene oxide ammonium sulphate (cf. para 1.1.) | 10.0 | — |
| | Potassium peroxo-disulphate | 3.7 | 3.7 |
| | TOTAL CHEMICALS Parts by weight (g) | 3507.0 | 3504.5 |

TABLE 5b

| Latex particle diameter range [nm] | 5-$A_{Fn}$ | | 5-$B_{Hn}$ | |
|---|---|---|---|---|
| | n | % | n | % |
| 60–70 | 1 | 0.5 | | |
| 70–80 | 18 | 9 | | |
| 80–90 | 62 | 31 | | |
| 90–100 | 86 | 43 | | |

TABLE 5b-continued

| Latex particle diameter range [nm] | 5-A$_{Fn}$ | | 5-B$_{Hn}$ | |
|---|---|---|---|---|
| | n | % | n | % |
| 110–120 | 28 | 14 | | |
| 120–130 | 4 | 2 | 1 | 0.5 |
| 130–140 | 1 | 0.5 | 2 | 1.0 |
| 140–150 | | | 27 | 13.5 |
| 150–160 | | | 90 | 45.0 |
| 160–170 | | | 64 | 32.0 |
| 170–180 | | | 16 | 8.0 |
| 180–190 | | | | |
| 190–200 | | | | |
| 200–210 | | | | |
| 210–220 | | | | |
| Average dispersion particle diameter, determined electron-microscopically [nm] | | 92 | | 160 |
| Average dispersion particle diameter | 4 Analyses 99; 99 98; 97 | | 4 Analyses 201; 200 193; 198 | |
| LKS [nm] | | | | |

EXAMPLE 6

In the preceding examples, fine-particled and coarse-particled dispersions produced by separate processes were mixed together to form dispersions according to the invention.

However, it is also possible to produce dispersions with bi-modal distribution by single pot processes.

In this case, a coarser particled latex is first produced using suitable emulsifiers or dispersants and, to this substantially polymerised latex, there is then added an excess of an anionic emulsifier which saturates the internal surface of the latex presented and also forms new micellae from which a new generation of latex particles can proceed as further monomers are added.

Suitable emulsifiers for the production of the coarser particled latex forming the main spheres include, for example, polysulphonates. However, it is also possible to produce these coarsely dispersed dispersions by known methods of "emulsifier-free polymerisation".

In the first instance (cf. Table 6a, experiments 6-A to 6-F), the polysulphonate emulsifier solutions 6.a.1 and the monomer mixtures 6.a.2 predominantly were placed in 4 liter polymerisation apparatus with stirring (250 revolutions per minute) and a nitrogen atmosphere, the mixtures heated to plus 70° C. and polymerised at 70° C. for 2 hours after addition of the initiator solutions 6.a.3. The alkane monosulphonate solutions 6.a.4 were now added in one lot to the substantially polymerised latices formed, and the monomer mixtures 6.a.5 and the activator solutions 6.a.6 added over 2 hours after adjustment of the temperature to 70° C. In experiment 6-F, some 20% ammonia water was added to the feed 6.a.6 in order to coarsen the particles.

Some approximately 49% pure, virtually coagulate-free dispersions which were adjusted to a pH value of 8.5 with 20% pure ammonia water as described in Example 1 and were then reacted with 1% by weight, based on polymer, of a non-ionogenic emulsifier based on a resinic acid (abietic acid) condensed with 50 mol ethylene oxide, dissolved in water, were formed.

All dispersions dry in about 48 to 49% form to clear lustrous films. After dilution with water to solids contents of from 45 to 37% by weight, differences are consequently noted in the quality of the clear film (cf. Table 6b).

The dispersions produced in this way do not consist of uniform latex particles. There is no broad particle diameter distribution present either. Instead, the dispersions are composed of latex particles with two virtually non-overlapping peaks in the average diameter for filler spheres and main spheres.

Table 6b accordingly gives the electron-microscopically determined average latex particle diameters $\bar{d}_H$ of the large particles (main spheres), the average diameters $\bar{d}_F$ of the smaller latex particle (filler spheres) and the ratio of the particle numbers $n_F{:}n_H$ for the dispersions 6-A to 6-F. The ratio $n_F{:}n_H$ was determined by counting out the small and large particles on electron-microscopic photographs in each case. The number of particles $n_F$ plus $n_H$ was usually 300 to 400 in this case.

The mass ratio $M_F{:}M_H$ can be calculated from the average diameters and the ratios of the numbers of particles.

Table 6b shows that films having good lustre at solids contents from 37 to 45% by weight are obtained if the filler spheres are larger than 70 nm and the main spheres larger than 150 nm.

On the other hand, the waterproof characteristic of the films is poor if the filler spheres are larger than 150 nm (Example 6-F$_n$).

TABLE 6a

| Solution, Mixture | Chemicals | 6-A | 6-B | 6-C | 6-D | 6-E | 6-F |
|---|---|---|---|---|---|---|---|
| 6.a.1 | De-ionized water | 400.00 | 600.00 | 900.00 | 1200.00 | 400.00 | 400.00 |
| | Emulsifier according to para. 1.1.1. Monosulphonate/polysulphonate = 30:70 pts. wt. | 2.00 | 3.00 | 4.50 | 6.00 | 1.00 | 2.00 |
| 6.a.2 | n-Butylacrylate | 121.00 | 181.50 | 272.20 | 363.00 | 121.00 | 121.00 |
| | Styrene | 81.80 | 122.70 | 184.10 | 245.50 | 81.80 | 81.80 |
| | Methacrylic acid | 11.70 | 17.60 | 26.30 | 35.10 | 11.70 | 11.70 |
| | N—methoxymethyl-methacrylamide | 1.95 | 2.92 | 4.38 | 5.85 | 1.95 | 1.95 |
| 6.a.3 | De-ionized water | 25.00 | 37.50 | 56.30 | 75.00 | 50.00 | 50.00 |
| | Ammoniumperoxodisulphate | 0.50 | 0.75 | 1.13 | 1.50 | 1.00 | 1.00 |
| 6.a.4 | 25% aqueous solution of a sodiumalkane monosulphonate | 45.45 | 68.20 | 102.30 | 132.30 | 66.00 | 97.00 |
| 6.a.5 | n-Butylacrylate | 848.90 | 788.40 | 697.50 | 606.90 | 848.90 | 848.90 |
| | Styrene | 574.00 | 533.10 | 471.70 | 410.00 | 574.00 | 574.00 |
| | Methacrylic acid | 82.10 | 76.20 | 67.50 | 58.70 | 82.10 | 82.10 |
| | N—Methoxymethyl-methacrylamide | 13.70 | 12.70 | 11.20 | 9.80 | 13.70 | 13.70 |

TABLE 6a-continued

| Solution, Mixture | Chemicals | 6-A | 6-B | 6-C | 6-D | 6-E | 6-F |
|---|---|---|---|---|---|---|---|
| 6.a.6 | De-ionized water | 1327.00 | 1114.50 | 795.70 | 477.00 | 1256.00 | 1256.00 |
| | Ammoniumperoxo-disulphate | 4.80 | 4.60 | 4.20 | 3.80 | 4.80 | 4.80 |
| | $NH_3$ solution 20% | — | — | — | — | — | 30.00 |
| | Solids content untreated Latex % by weight | 49.1 | 48.5 | 48.7 | 48.3 | 49.7 | 48.7 |

TABLE 6b

| Dispersion | 6-$A_n$ | 6-$B_n$ | 6-$C_n$ | 6-$D_n$ | 6-$E_n$ | 6-$F_n$ |
|---|---|---|---|---|---|---|
| $\bar{d}_H$ (nm) | 186 | 158 | 148 | 135 | 160 | 370 |
| $\bar{d}_F$ (nm) | 126 | 89 | 68 | 49 | 78 | 159 |
| $d_H:d_F$ | 1.48 | 1.77 | 2.18 | 2.76 | 2.05 | 2.33 |
| $n_F:n_H$ | 1.3 | 2.5 | 2.3 | 1.9 | 25 | 5.5 |
| $M_F:M_H$ | 1:2.5 | 1:2.2 | 1:4.5 | 1:11 | 2.9:1 | 1:2.3 |

| Solids Content % by weight after dilution | 150μ wet films, dried for 60 mins at 50° C. | | | | | | | | | | | |
|---|---|---|---|---|---|---|---|---|---|---|---|---|
| | T | WF | T | WF | T | WF | T | WF | T | WF | T | WF |
| 45 | 0 | 4D | 0 | 4D | 1 | 4D | 4 | 4D | 0 | 4D | 0 | 2D |
| 40 | 0 | ¾D | 0 | ¾D | 2 | 3D | 5 | 3D | 1 | 4D | 0 | 1A |
| 37 | 0 | 2D | 0 | 3D | 3 | 3D | 5 | 3D | 1 | 3D | 0 | 1A |

We claim:

1. An aqueous dispersion containing as binder at least one film-forming polymer comprising copolymerized units of from 48 to 60% by weight n-butyl acrylate; from 35 to 48% by weight styrene; from 4 to 6% by weight methacrylic acid or acrylic acid or a mixture thereof, and from 0 to 13% by weight N-methoxymethylmethacrylamide, the sum of the percentages by weight being 100, said polymer being in the form of larger, non-agglomerated, spherical particles or main spheres and smaller, non-agglomerated spherical particles or filler spheres, wherein the filler spheres have an average particle diameter $\bar{d}_F$ measured using an electron microscope of from 50 to 150 nanometers and the average diameter of the main spheres $\bar{d}_H$ is at least 140 mn—there are two pronounced, substantially non-overlapping peaks in the particle size distribution within the specified particle size ranges and the ratio of the total mass of the polymer composed of main spheres $M_H$ to the total mass of the polymer composed of filler spheres $M_F$ is $$M_H:M_F = 20:1 \text{ to } M_H:M_F = 1:20$$

and wherein at least 70% of the number of main spheres and at least 70% of the number of filler spheres lie in the range of ±25% of the respective given average value of $\bar{d}_H$ or $\bar{d}_F$ and wherein, if the dispersion contains several differing polymers with respect to chemical and percentage composition, they are mutually compatible.

2. An aqueous dispersion according to claim 1, wherein the average particle diameter $\bar{d}_H$ is from 80 to 130 nm, the average diameter $\bar{d}_F$ is from 1.8 to 3.5 times greater than $\bar{d}_F$ and the total mass ratio $M_H$ to $M_F$ is from 1:10 to 2:1.

3. An aqueous dispersion according to claim 1, wherein the solids content of the film-forming polymer is from 37 to 55% by weight.

4. A method for the preparation of an aqueous dispersion according to claim 1, wherein a dispersion containing the polymer in the form of the larger, non-agglomerated spherical particles or main spheres is intimately distributed in a dispersion containing the polymer in the form of the smaller, non-agglomerated, spherical particles or filler spheres in the given mass ratio according to claim 1, wherein the pH of the total dispersion thus obtained is adjusted to a pH value of from 7 to 9 by addition of a non-ionogenic emulsifier in a quantity of from 0.5 to 3% by weight, based on polymer, and wherein the resulting total dispersion is stabilized.

5. An aqueous paint containing an aqueous dispersion according to claim 1.

6. A coating agent for plastics, metals, wood, glass, paper or cardboard articles containing an aqueous dispersion according to claim 1.

7. A road-marking paint containing an aqueous dispersion according to claim 1 as a binder.

8. Print dyes for textiles and leather containing an aqueous dispersion according to claim 1 as a binder.

9. Impregnation or compacting agents for paper, woven or non-woven textiles and leather containing an aqueous dispersion according to claim 1 as a binder.

* * * * *